US012067960B2

(12) United States Patent
Gutsman

(10) Patent No.: US 12,067,960 B2
(45) Date of Patent: Aug. 20, 2024

(54) RESONATOR ACCESSORIES FOR MUSICAL INSTRUMENTS

(71) Applicant: Liquid Sound Technologies, Gainesville, GA (US)

(72) Inventor: Vladimir P. Gutsman, Gainesville, GA (US)

( * ) Notice: Subject to any disclaimer, the term of this patent is extended or adjusted under 35 U.S.C. 154(b) by 167 days.

(21) Appl. No.: 17/523,707

(22) Filed: Nov. 10, 2021

(65) Prior Publication Data

US 2022/0148540 A1 May 12, 2022

Related U.S. Application Data

(60) Provisional application No. 63/217,497, filed on Jul. 1, 2021, provisional application No. 63/111,813, filed on Nov. 10, 2020.

(51) Int. Cl.

| | |
|---|---|
| ***G10D 3/02*** | (2006.01) |
| ***G10D 1/08*** | (2006.01) |
| ***G10D 3/04*** | (2020.01) |
| ***G10D 3/12*** | (2020.01) |
| ***G10D 3/22*** | (2020.01) |
| ***G10D 13/02*** | (2020.01) |
| ***G10D 13/10*** | (2020.01) |
| ***G10D 13/16*** | (2020.01) |

(52) U.S. Cl.

CPC ................. *G10D 3/02* (2013.01); *G10D 1/08* (2013.01); *G10D 3/04* (2013.01); *G10D 3/12* (2013.01); *G10D 3/22* (2020.02); *G10D 13/02* (2013.01); *G10D 13/16* (2020.02); *G10D 13/25* (2020.02)

(58) Field of Classification Search

CPC .. G10D 3/02; G10D 1/08; G10D 3/04; G10D 3/12; G10D 3/22; G10D 13/02; G10D 13/16; G10D 13/25; G10D 3/147; G10D 13/24

See application file for complete search history.

(56) References Cited

U.S. PATENT DOCUMENTS

| | | | |
|---|---|---|---|
| 7,259,308 | B2 | 8/2007 | Geiger |
| 10,255,892 | B1 | 4/2019 | Gutsman |

FOREIGN PATENT DOCUMENTS

| | | | | |
|---|---|---|---|---|
| JP | 3088691 B2 * | 9/2000 | ........... | G10D 13/021 |

* cited by examiner

*Primary Examiner* — Kimberly R Lockett
(74) *Attorney, Agent, or Firm* — Dentons Durham Jones Pinegar; Sarah W. Matthews; Lilly Godfrey

(57) ABSTRACT

Accessories to improve the tonal qualities of a guitar or other stringed instruments include a bridge sound plate, a bridge support, a stress tube, and one or more bridge pin bolts. A bridge pin bolt may include a head, a shank, a thread, and a nut, the head of the bridge pin bolt having a void therethrough extending from a front of the head to a back of the head to receive a guitar string therethrough, the void extending upwardly from the front of the head to the back of the head. One or more of the accessories may be formed of brass or another material with good tonal properties. A sound plate may be adjustable or tunable. The accessories may be used independently, or may be used together as a system of accessories.

21 Claims, 20 Drawing Sheets

RESONATOR ACCESSORIES FOR MUSICAL INSTRUMENTS

CROSS REFERENCE TO RELATED APPLICATIONS

A claim is hereby made to the Nov. 10, 2020 filing date of U.S. Patent Application No. 63/111,813, titled Resonator Accessories for Guitar ("the '813 Provisional Application"), and the Jul. 1, 2021 filing date of U.S. Patent Application No. 63/217,497, titled Resonator Device for Musical Instruments ("the '497 Provisional Application"). The entire disclosures of the '813 Provisional Application and the '497 Provisional Application are hereby incorporated herein.

TECHNICAL FIELD

This disclosure relates generally to accessories for musical instruments, such as resonating devices. More specifically, the disclosure relates to a resonator which may be used for pianos, drums, etc.

BACKGROUND

Known resonator assemblies are designed to be attached to a conventional acoustic guitar to improve the quality and volume of the conventional guitar. For example, U.S. Pat. Nos. 7,259,308 and 10,255,892 describe resonators which may be attached to a conventional guitars. U.S. Pat. No. 10,255,892 is hereby incorporated by reference in its entirety. However, it may be difficult to attach resonators to existing instruments without the need for extensive retrofitting.

A need still exists for a device and method that would enhance resonation for instruments, such as guitars, pianos, drums, etc.

SUMMARY

This disclosure relates to a guitar accessory system which may include: a bridge sound plate to be attached inside a body of the guitar under the bridge; a bridge support to be attached to an underside of the bridge sound plate, the bridge support having a top side and a bottom void for receiving a stress tube, and a vertical portion extending from the top side to the bottom void; the stress tube, the stress tube insertable into the bottom void of the bridge support, the stress tube and bridge support to provide tension to the bridge sound plate within the body of the guitar; and at least one bridge pin bolt for connecting the bridge sound plate and bridge support to the body of the guitar, the at least one bridge pin bolt comprising a head, a shank, a thread, and a nut, the head of the bridge pin bolt having a void therethrough extending from a front to a back, the void having an angle of between 15 to 25 degrees.

According to another aspect, a bridge pin bolt is disclosed for use alone, or for use with a bridge sound plate and/or bridge support and stress tube. The bridge pin bolt may comprise: a head, a shank, a thread, and a nut, the head of the bridge pin bolt having a void therethrough extending from a front to a back, the void having an angle of between 15 to 25 degrees above horizontal.

According to another aspect, a method is described for improving the sustain of a drum, the method comprising: selecting a drum, selecting a sound plate, and installing the sound plate substantially vertically within the body of the guitar.

According to another aspect, a sound plate for improving the sustain of an instrument may comprise: a main body having a first slot and a second slot formed therein; and a first tuning element moveable within the first slot and a second tuning element moveable within the second slot to adjust a resonance of the sound plate.

In other configurations, a sound plate for improving the sustain of an instrument may comprise: a main body having a first slot formed therein; and a first tunable element moveable within the first slot to adjust a resonance of the sound plate.

A sound plate for improving the sustain of an instrument may comprise: a main body having a first projection extending therefrom; and a first tunable element moveable along the first projection to adjust a resonance of the sound plate. The sound plate may also comprise a second projection extending therefrom and a second tuning element moveable along the second projection to adjust a resonance of the sound plate.

These and other aspects are described below.

BRIEF DESCRIPTION OF THE DRAWINGS

The following drawings illustrate what are currently considered to be specific representative configurations for carrying out the disclosed subject matter and are not limiting as to embodiments which may be made in accordance with the present disclosed subject matter. The components in the drawings are not necessarily to scale relative to each other. Like reference numerals designate corresponding parts throughout the several views.

The drawings are illustrative and not limiting of the scope of the disclosed subject matter which is defined by the appended claims. The various elements of the disclosed subject matter accomplish various aspects and objects of the disclosed subject matter. Not every element of the disclosed subject matter can be clearly displayed in a single drawing, and as such not every drawing shows each element of the disclosed subject matter.

In the drawings:

FIG. 1 is a perspective view of a guitar with exemplary accessories as disclosed herein installed on the guitar.

FIG. 2 is a top view of an exemplary bridge sound plate.

FIG. 3 is a top view of another configuration of a bridge sound plate.

FIG. 4 is a top view of yet another configuration of a bridge sound plate.

FIG. 5 is a bottom perspective view of a bridge support.

FIG. 6 is a top perspective view of the bridge support of FIG. 5.

FIG. 7 is a rear view of the bridge support of FIG. 5.

FIG. 8 is a front view of the bridge support of FIG. 5.

FIG. 9 is a perspective view of a stress tube.

FIG. 10 is a cross-sectional view of the stress tube of FIG. 9.

FIG. 11 is a rear perspective view of a bridge pin bolt.

Figure 11:
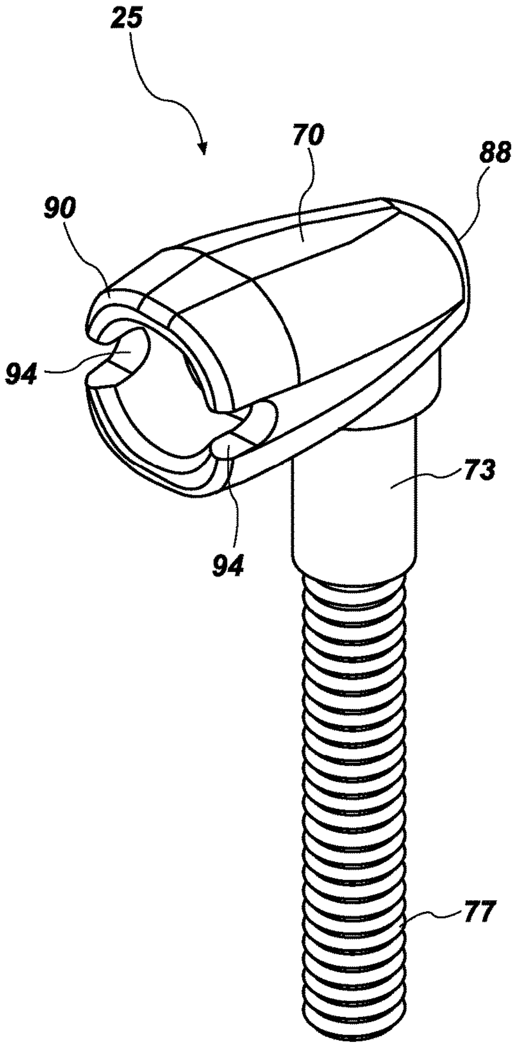
Figure 12:
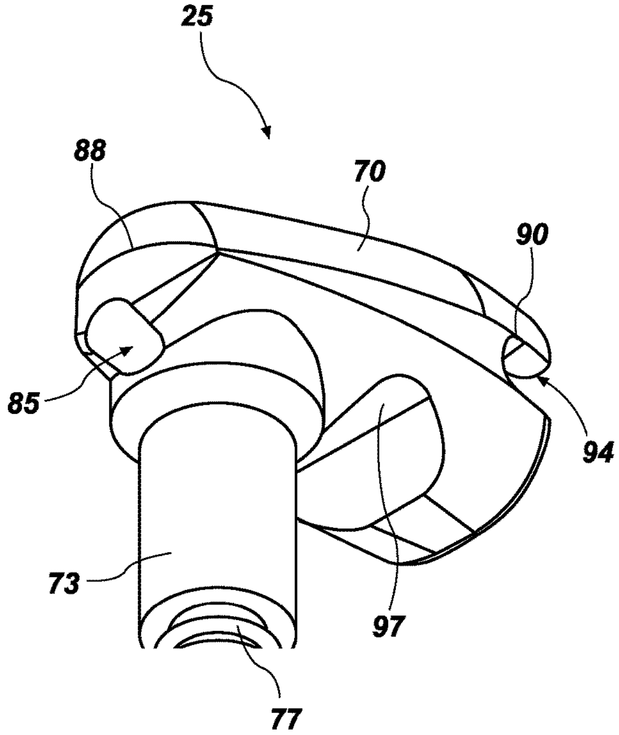

FIG. 12 is a front perspective view of the bridge pin bolt of FIG. 11.

Figure 13:
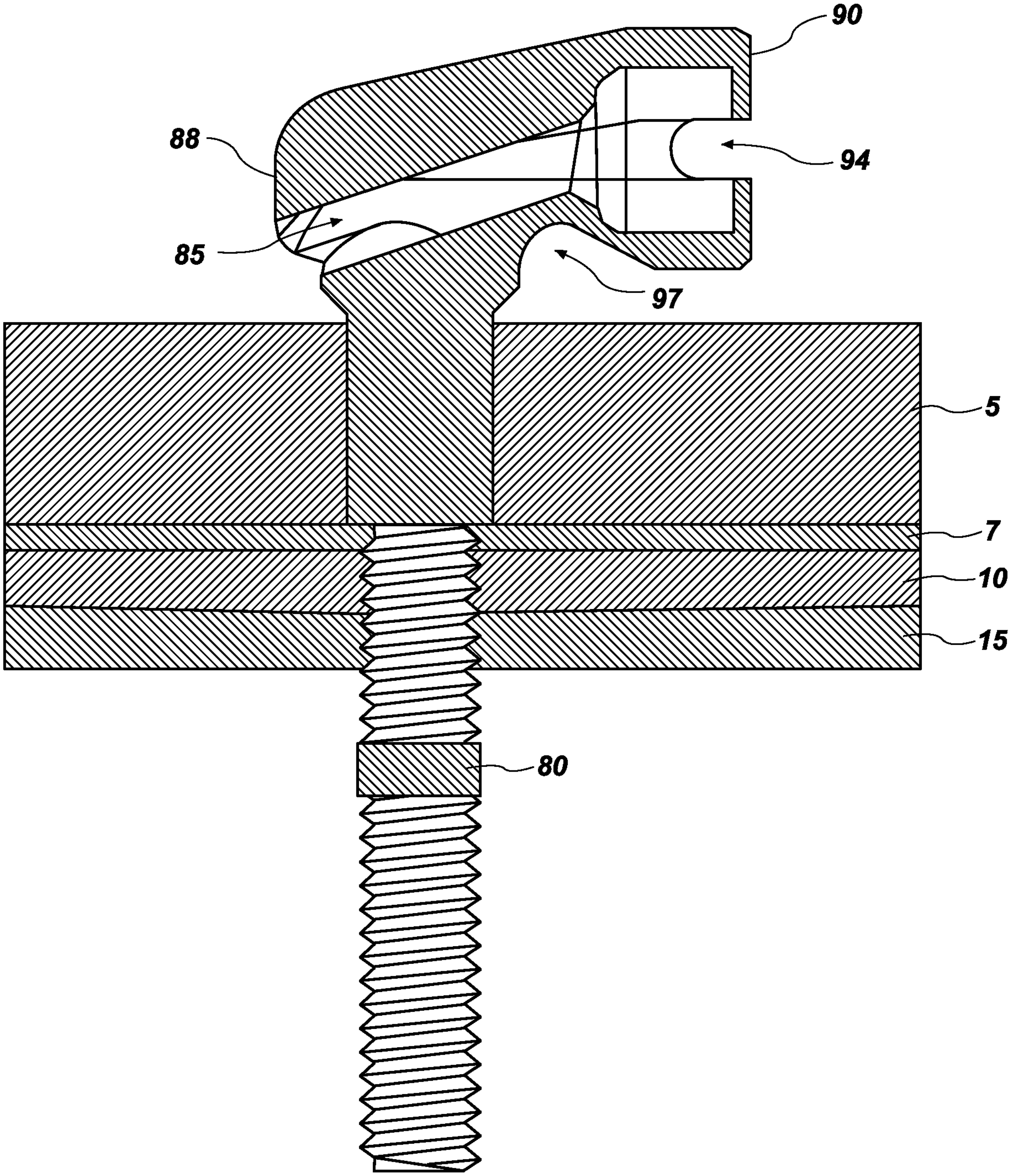

FIG. 13 is a cross-sectional view of a bridge pin bolt, sound plate, and bridge support installed on a guitar.

Figure 14:
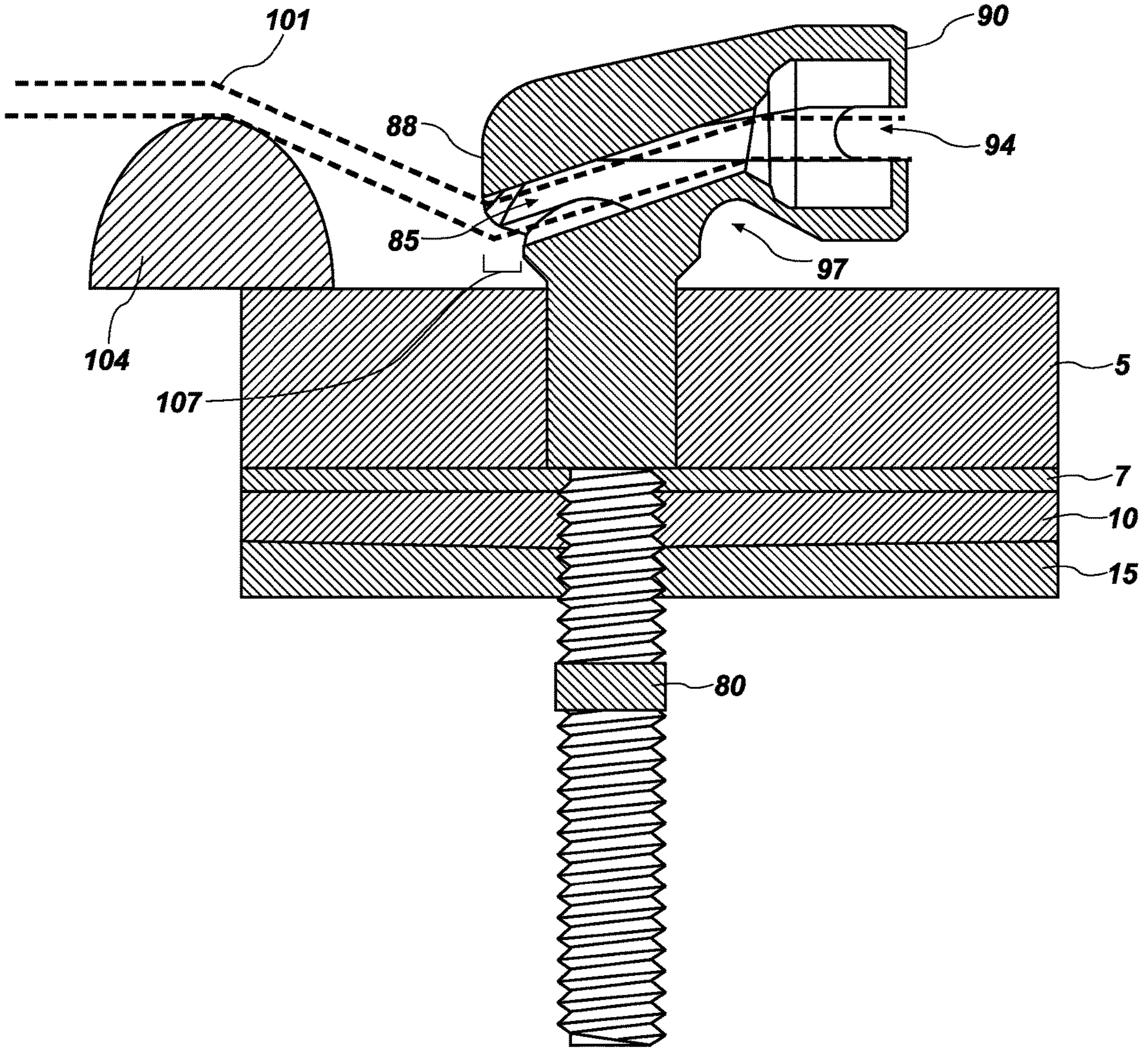

FIG. 14 is the cross-sectional view of FIG. 13 with an exemplary string in place over a saddle and through the bridge pin bolt.

Figure 15A:
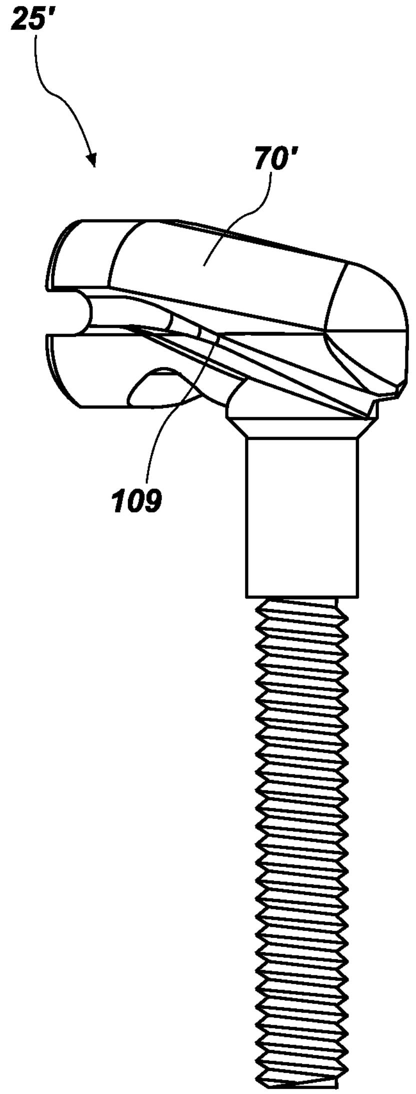

FIG. 15A is a perspective view of another exemplary bridge pin bolt.

Figure 15B:
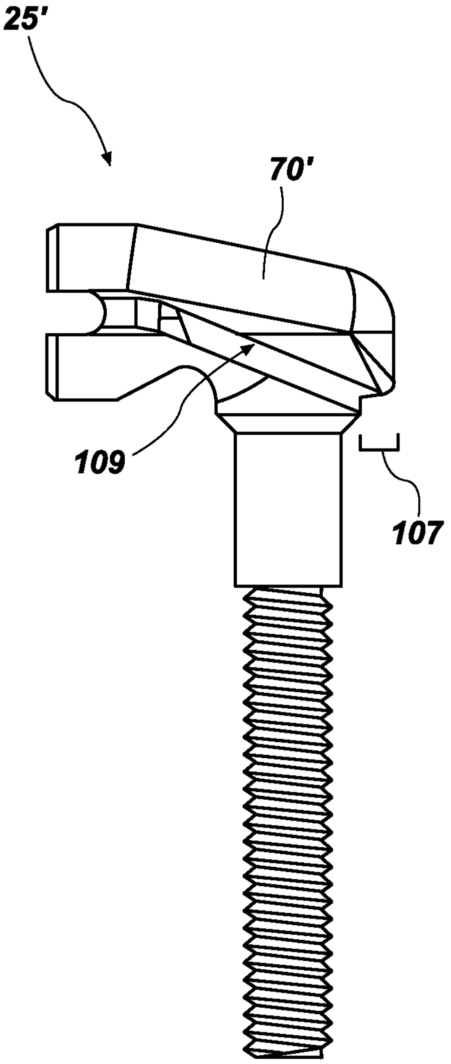

FIG. 15B is a side plan view of the exemplary bridge pin bolt of FIG. 15A.

Figure 16:
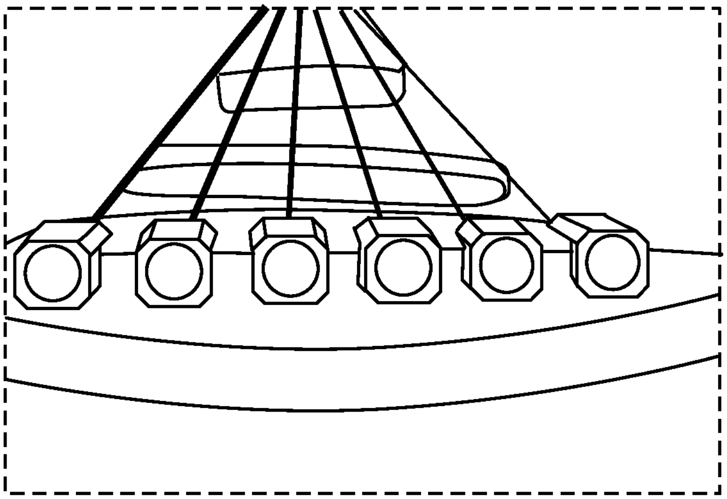

FIG. 16 is a perspective view of bridge pin bolts installed on a guitar.

Figure 17:
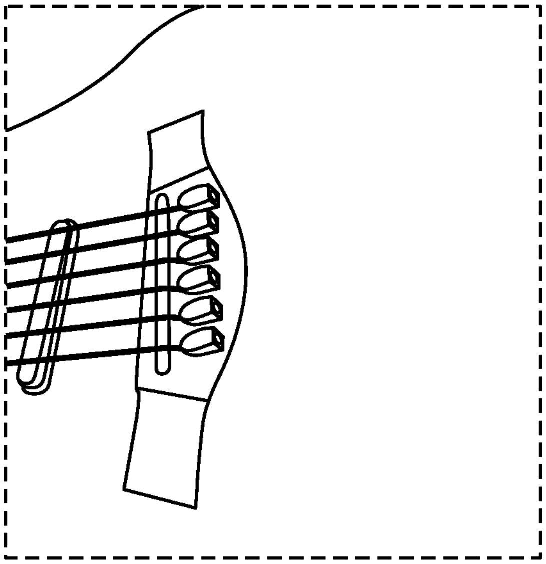

FIG. 17 is another perspective view of the bridge pin bolts installed in FIG. 16.

Figure 18:
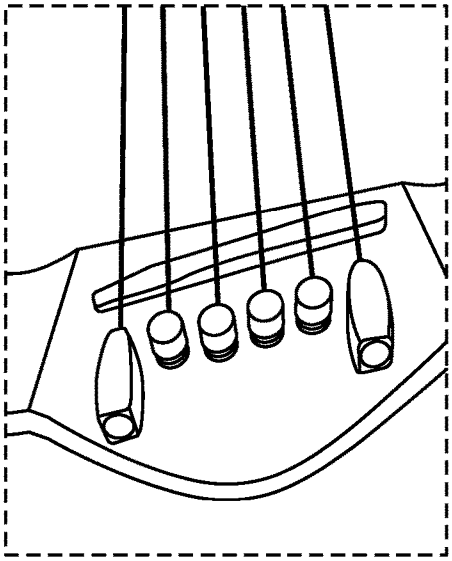

FIG. 18 is a perspective view of another configuration of bridge pin bolts installed on a guitar.

Figure 19:
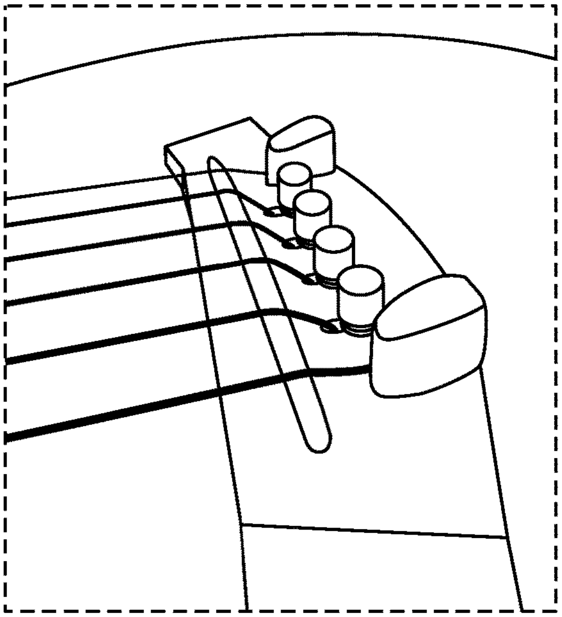

FIG. 19 is another perspective view of the bridge pin bolts installed on the guitar of FIG. 18.

Figure 20:
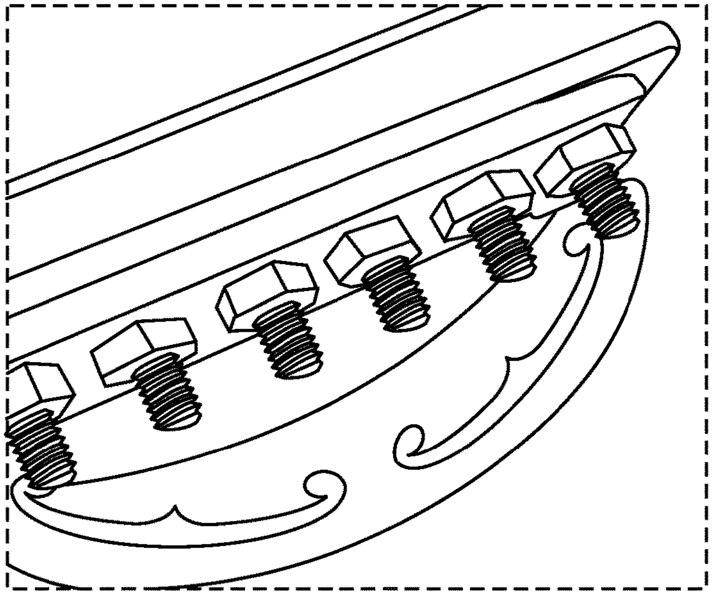

FIG. 20 is a perspective view of a sound plate installed on a guitar, as seen from the inside of the body of the guitar.

Figure 21:
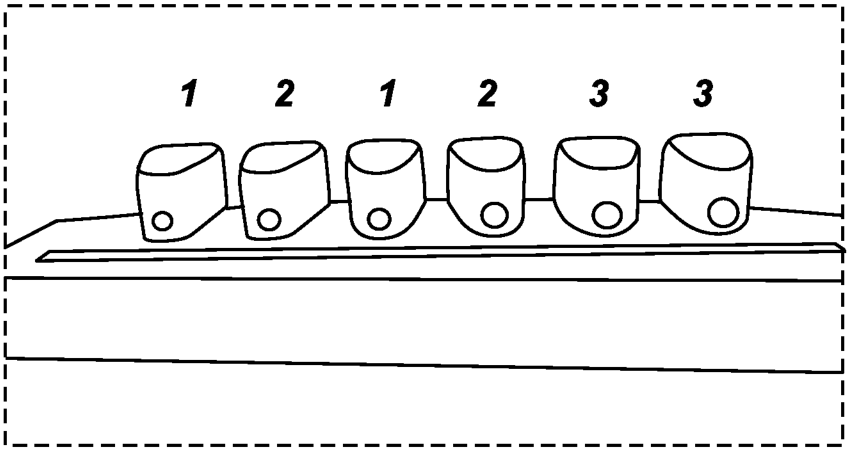

FIG. 21 is a view of bridge pin bolts being installed on a guitar bridge, with the saddle and strings removed for clarity.

Figure 22:
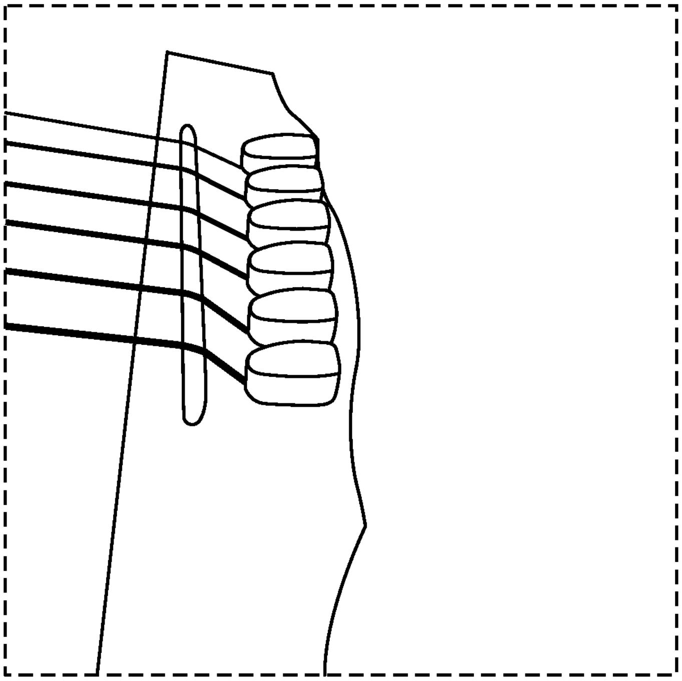

FIG. 22 is a perspective view of bridge pin plates installed on a guitar with a greater break angle of the strings.

Figure 1:
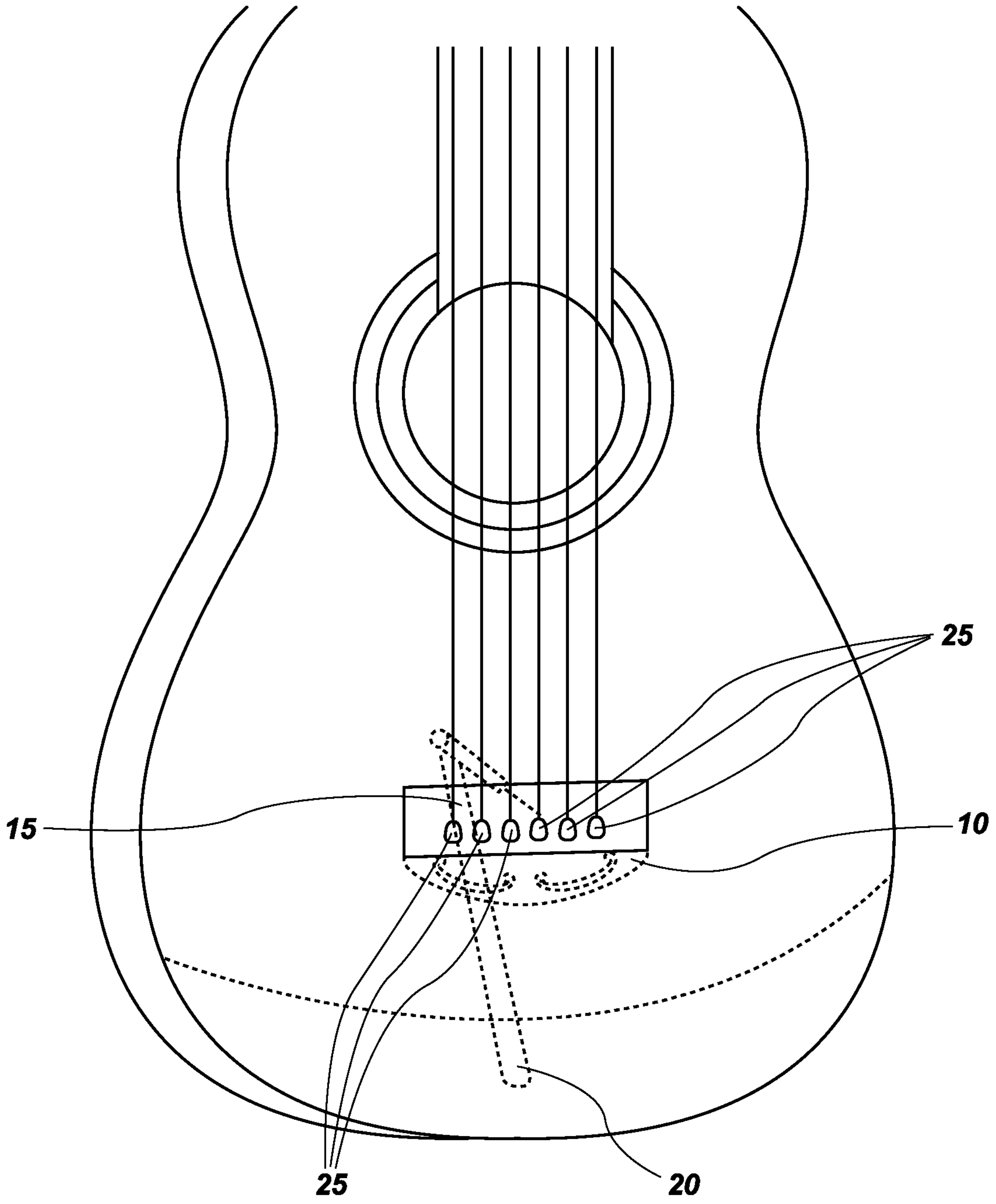
Figure 23:
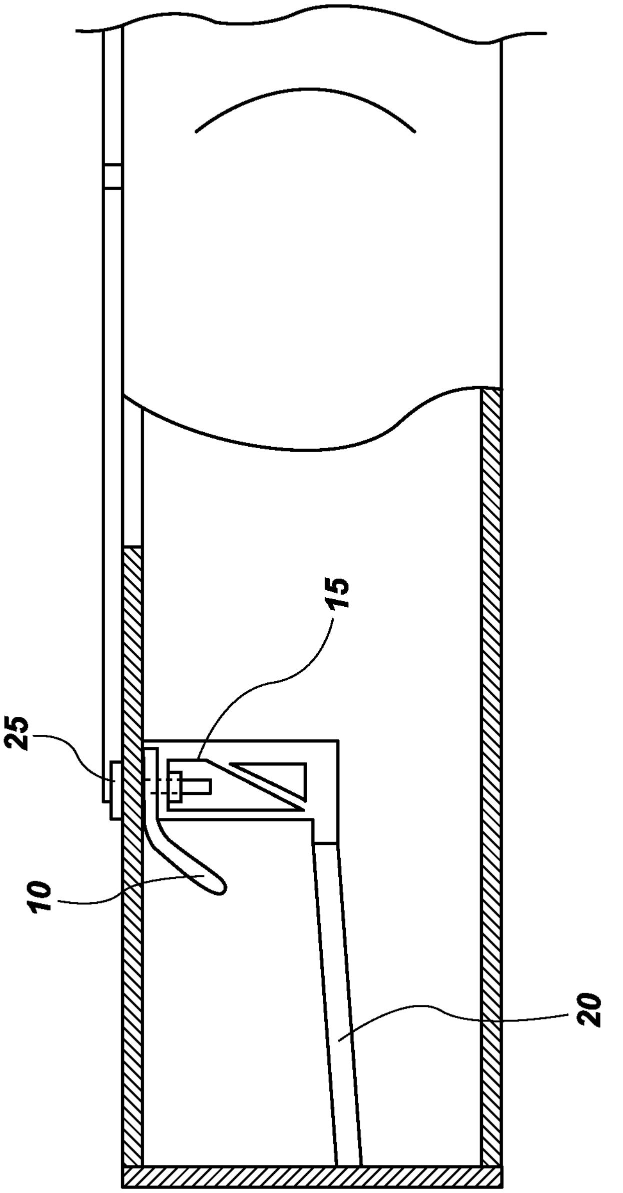

FIG. 23 is a cross-sectional view of FIG. 1 with exemplary accessories as disclosed herein installed on the guitar.

Figure 24:
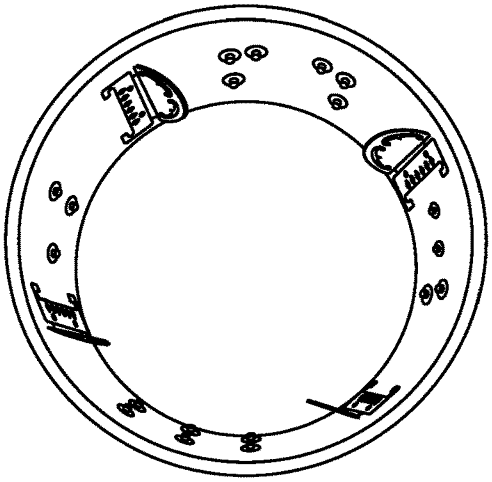
Figure 25:
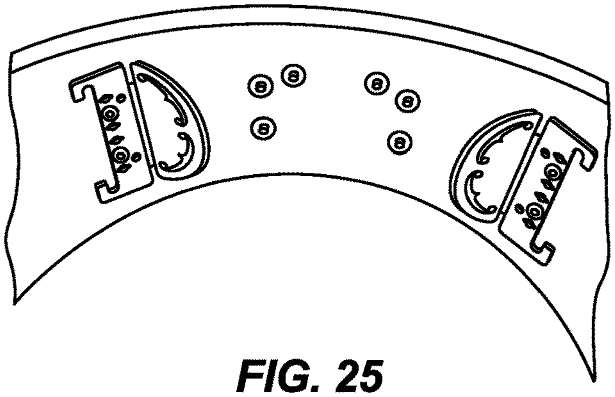
Figure 26:
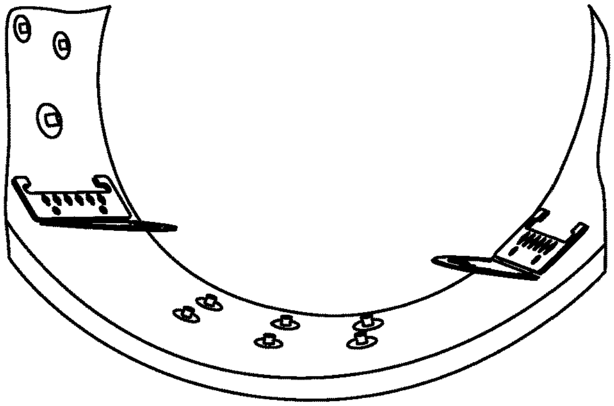

FIGS. 24-26 show perspective views of sound plates installed on a drum.

Figure 27:
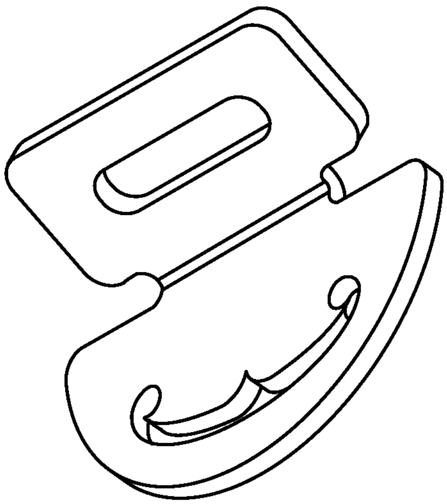

FIG. 27 shows a perspective view of an exemplary configurations of sound plates.

Figure 28:
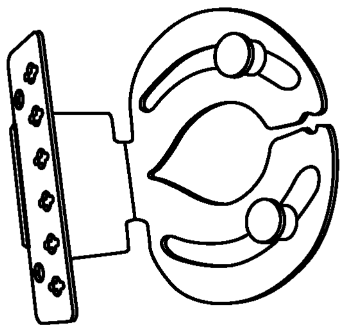
Figure 29:
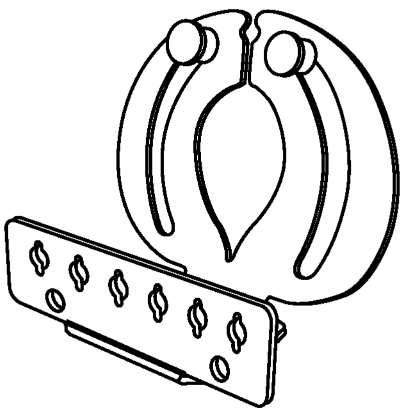
Figure 30:
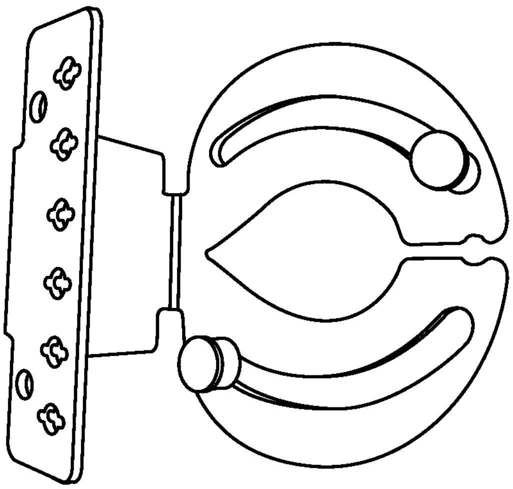

FIGS. 28-30 show perspective views of exemplary tunable sound plates as described herein.

Figure 31:
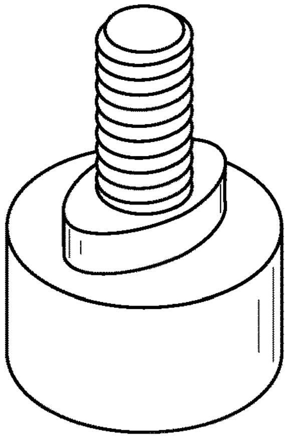

FIG. 31 shows a perspective view of a tunable bolt.

Figure 32:
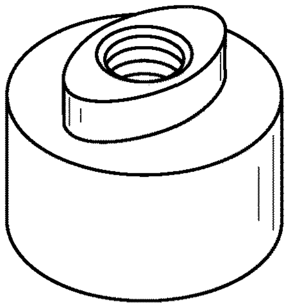

FIG. 32 shows perspective view of a tunable nut.

Figure 33:
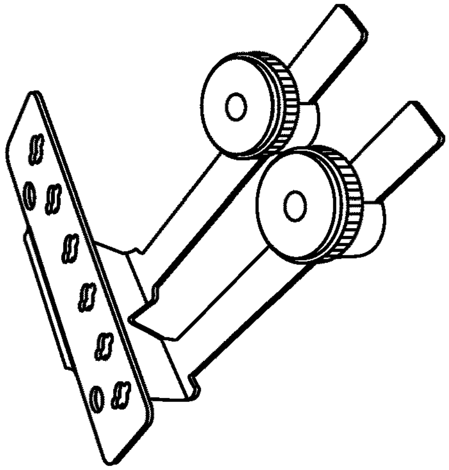

FIG. 33 shows a perspective view of another configuration of an exemplary tunable sound plate as described herein.

Figure 34:
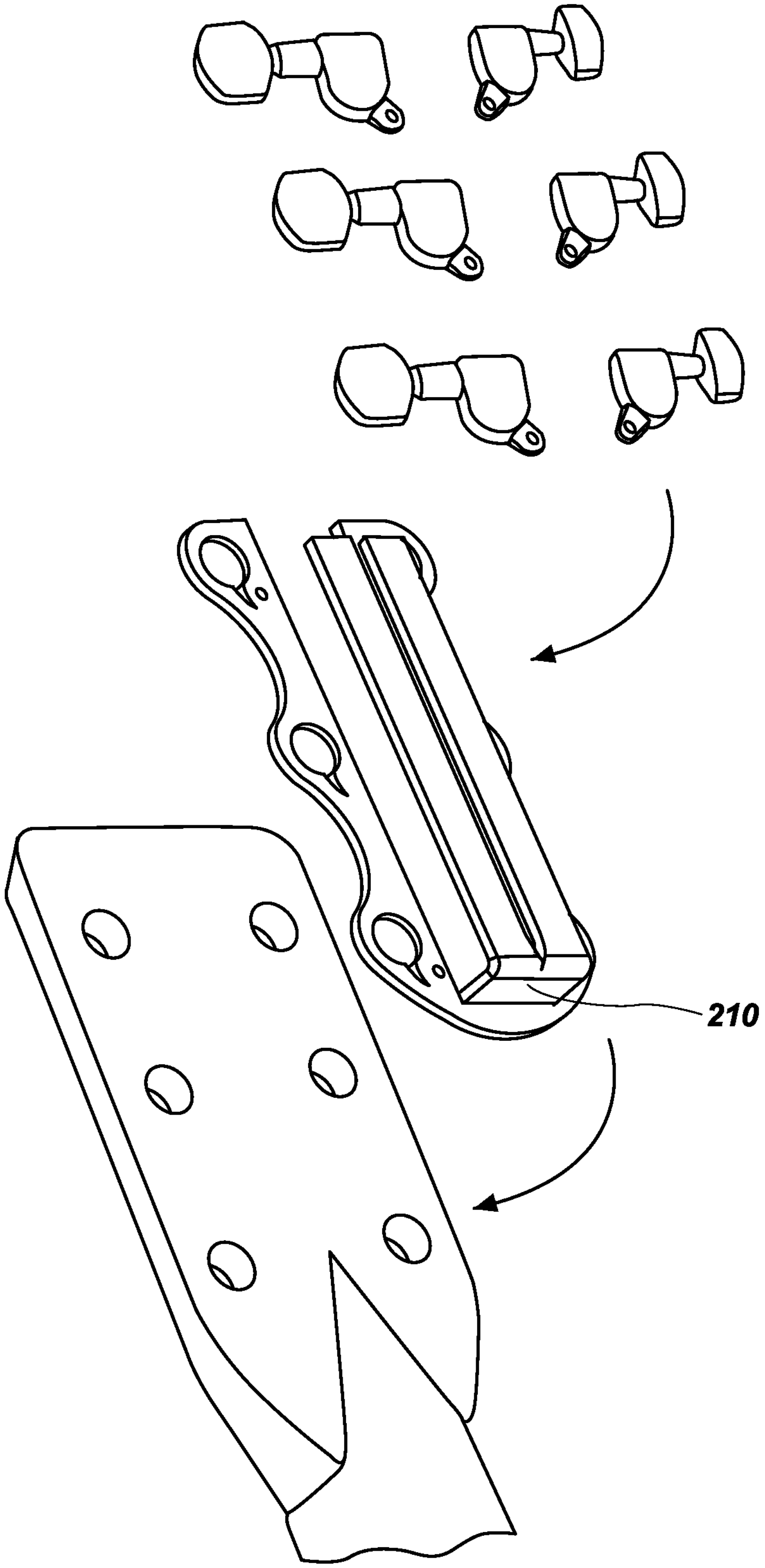

FIG. 34 shows a perspective, exploded view of a tunable sound plate attached to the back side of a guitar headstock.

Figure 35:
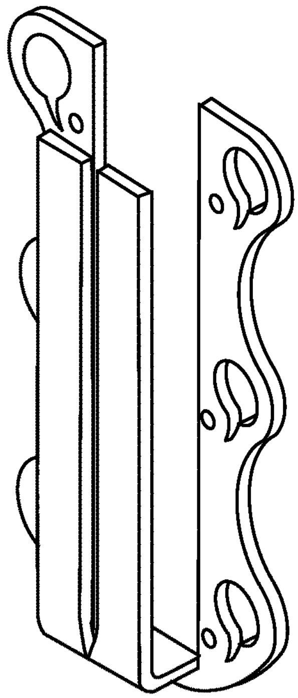

FIG. 35 shows a perspective view of the tunable sound plate of FIG. 31.

Figure 36:
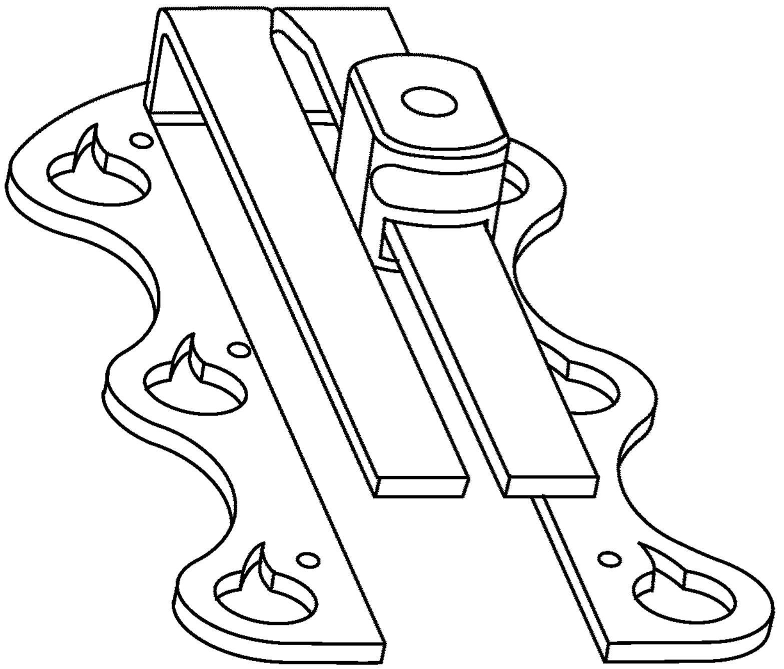

FIG. 36 shows a perspective view of the tunable sound plate of FIG. 32 with a mounted tuning bolt and nut attached thereto.

DETAILED DESCRIPTION

The following provides a detailed description of particular embodiments of the present disclosed subject matter. Reference will now be made to the drawings in which the various elements of the illustrated configurations will be given numerical designations and in which the disclosed subject matter will be discussed so as to enable one skilled in the art to make and use the subject matter. It is to be understood that the following description is only exemplary of the principles of the present disclosed subject matter, and should not be viewed as narrowing the scope of the claims which follow, which claims define the full scope of the disclosed subject matter.

It will be appreciated that various aspects discussed in one drawing may be present and/or used in conjunction with the embodiment shown in another drawing, and each element shown in multiple drawings may be discussed only once. For example, in some cases, detailed description of well-known items or repeated description of substantially the same configurations may be omitted. The reason is to facilitate the understanding of those skilled in the art by avoiding the following description from being unnecessarily redundant. The accompanying drawings and the following description are provided in order for those skilled in the art to fully understand the present disclosure, and these are not intended to limit the gist disclosed in the scope of claims.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the disclosed subject matter and the concepts contributed by the inventor to furthering the art, and are to be construed as being without limitation to such specifically recited examples and conditions. Moreover, all statements herein reciting principles, aspects, and embodiments of the disclosed subject matter, as well as specific examples thereof, are intended to encompass equivalents thereof.

Reference in the specification to "one configuration" "one embodiment," "a configuration" or "an embodiment" means that a particular feature, structure, or characteristic described in connection with the configuration is included in at least one configuration, but is not a requirement that such feature, structure or characteristic be present in any particular configuration unless expressly set forth in the claims as being present. The appearances of the phrase "in one configuration" in various places may not necessarily limit the inclusion of a particular element of the disclosed subject matter to a single configuration, rather the element may be included in other or all configurations discussed herein.

Furthermore, the described features, structures, or characteristics of configurations of the disclosed subject matter may be combined in any suitable manner in one or more configurations. In the following description, numerous specific details are provided, such as examples of products or manufacturing techniques that may be used, to provide a thorough understanding of configurations of the disclosed subject matter. One skilled in the relevant art will recognize, however, that configurations of the disclosed subject matter may be practiced without one or more of the specific details, or with other methods, components, materials, and so forth. In other instances, well-known structures, materials, or operations are not shown or described in detail to avoid obscuring aspects of the disclosed subject matter.

Before the present disclosed subject matter is disclosed and described in detail, it should be understood that the present disclosure is not limited to any particular structures, process steps, or materials discussed or disclosed herein, but is extended to include equivalents thereof as would be recognized by those of ordinary skill in the relevant art. More specifically, the disclosed subject matter is defined by the terms set forth in the claims. It should also be understood that terminology contained herein is used for the purpose of describing particular aspects of the disclosed subject matter only and is not intended to limit the disclosed subject matter to the aspects or configurations shown unless expressly indicated as such. Likewise, the discussion of any particular aspect of the disclosed subject matter is not to be understood as a requirement that such aspect is required to be present apart from an express inclusion of the aspect in the claims.

It should also be noted that, as used in this specification and the appended claims, singular forms such as "a," "an," and "the" may include the plural unless the context clearly dictates otherwise. Thus, for example, reference to "a bridge pin" may include one or more of such bridge pins, and reference to "the string" may include reference to one or more of such strings.

As used herein, the term "about" is used to provide flexibility to a numerical range endpoint by providing that a given value may be "a little above" or "a little below" the endpoint while still accomplishing the function associated with the range. For example, about may be 5 to 10 percent above or below a given value. In one configuration, "about" means within 10 percent of a given value (above or below).

Similarly, "substantially" may give flexibility of 5 to 10 percent such that an element that is "substantially" vertical is either completely vertical (i.e. 90 degrees) or nearly completely vertical (i.e., from 80 degrees to 100 degrees, from 85 degrees to 95 degrees, etc.).

As used herein, a plurality of items, structural elements, compositional elements, and/or materials may be presented in a common list for convenience. However, these lists should be construed as though each member of the list is individually identified as a separate and unique member.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 5 to about 60" should be interpreted to include not only the explicitly recited values of about 1 to about 5, but also include individual values and sub-ranges within the indicated range. Thus, included in this numerical range are individual values such as 6, 7, 8, 9, etc., through 60, and sub-ranges such as from 10-20, from 30-40, and from 50-60, etc., as well as each number individually. This same principle applies to ranges reciting only one numerical value as a minimum or a maximum. Furthermore, such an interpretation should apply regardless of the breadth of the range or the characteristics being described. Additionally, the word "connected" and "coupled" is used throughout for clarity of the description and can include either a direct connection or an indirect connection.

This disclosure relates generally to one or more accessories for use with a stringed instrument. As described herein, the disclosure will reference use with a guitar, but it will be appreciated that the principles of the invention may be applied to other stringed instruments. Several accessories are described, and may be used either in conjunction or as stand-alone accessories. FIG. 1 shows a guitar with each accessory installed on the guitar, including a bridge sound plate 10, a bridge support 15, a stress tube 20, and bridge pin bolts 25. Each accessory, including bridge sound plate 10, bridge support 15, stress tube 20, and bridge pin bolts 25, will be described in turn. It will be appreciated that each accessory may be used alone, or may be used in conjunction with the other accessories.

According to one aspect, a bridge sound plate 10 is disclosed. The bridge sound plate may be formed of any suitable material, and in one configuration, the bridge sound plate 10 is formed of brass, due to the resonant qualities of brass. Other metal alloys may also be used, as well as non-metals. In one configuration, naval brass comprising copper, tin, and zinc may be used to form the bridge sound plate. The shape and size of the sound plate may vary depending on the desired characteristics of the sound plate. The sound plate may include a base portion 29 with one or more mounting holes 33 for connecting the sound plate to the bridge of the guitar. The base 29 portion may have a width of approximately the same width as a guitar bridge.

The sound plate 10 may be attached to the inside of the body of a guitar. For example the sound plate 10 may be attached underneath the bridge of the guitar. The base portion 29 may be placed underneath the bridge of the guitar, and the mounting holes 33 of the base portion 29 may correspond to similar holes in the bridge for receiving bridge pins (or bridge pin bolts 25, as described below).

Figure 2:
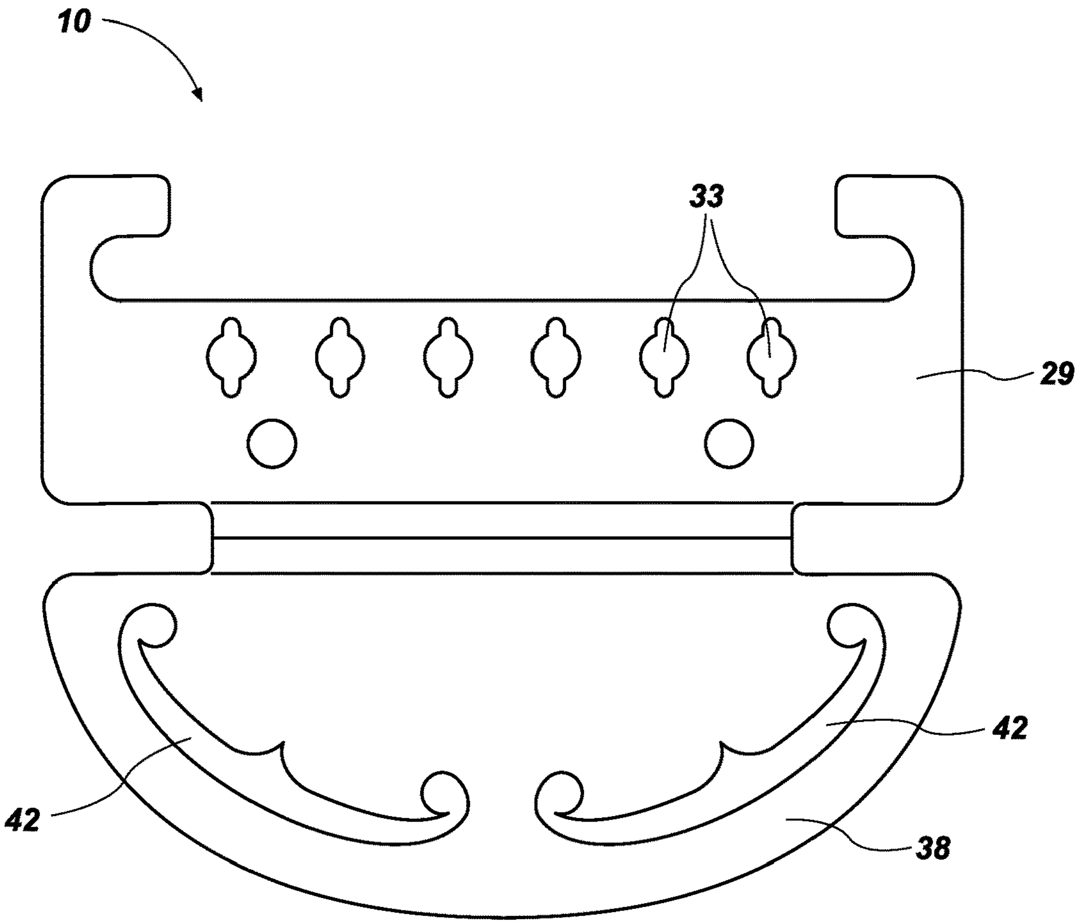
Figure 3:
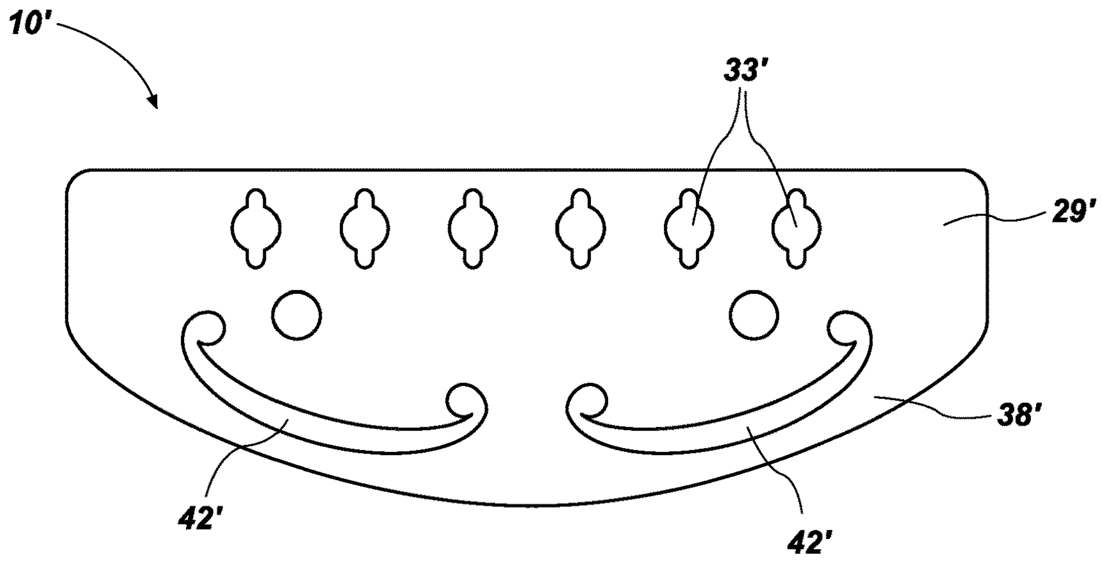
Figure 4:
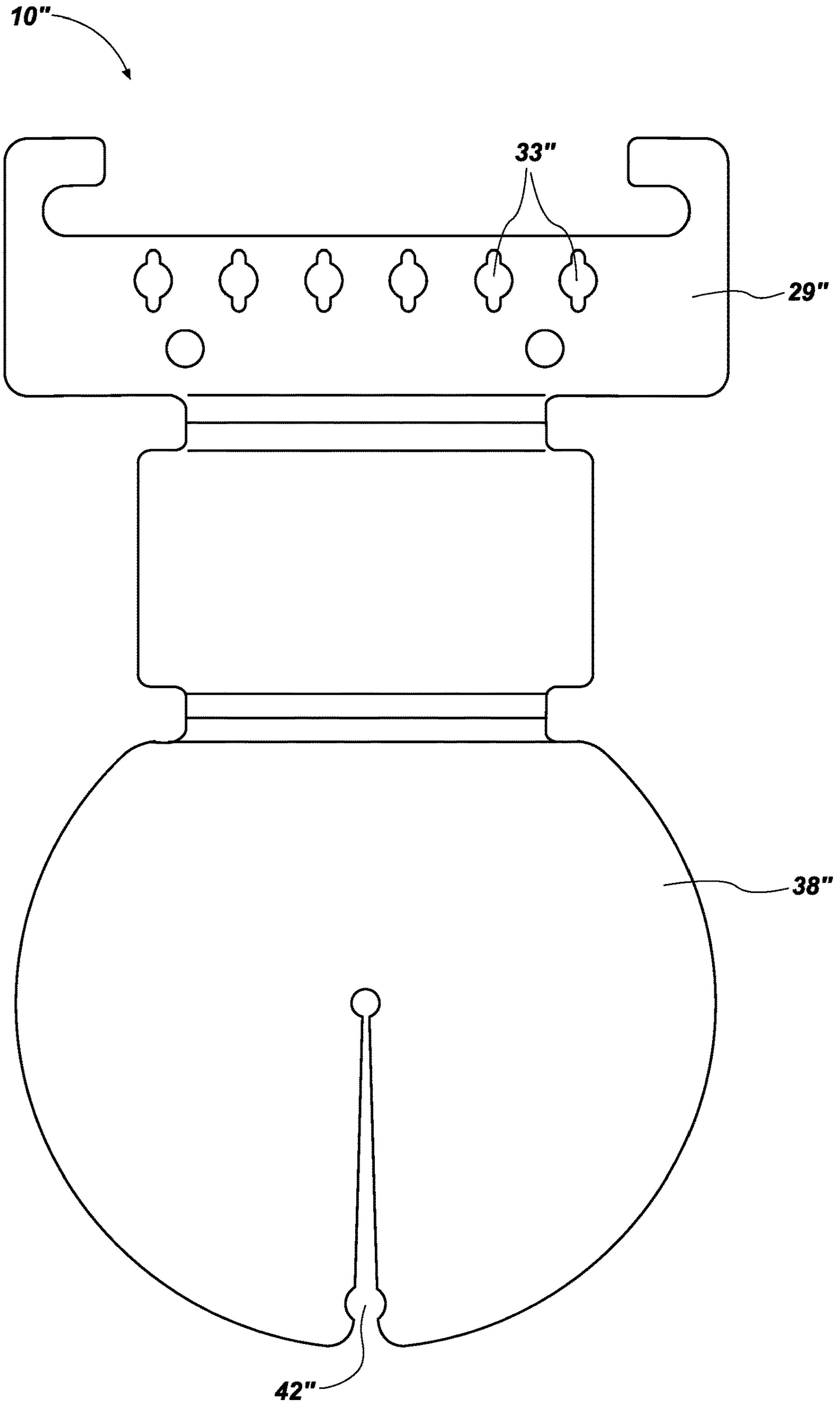
Figure 5:
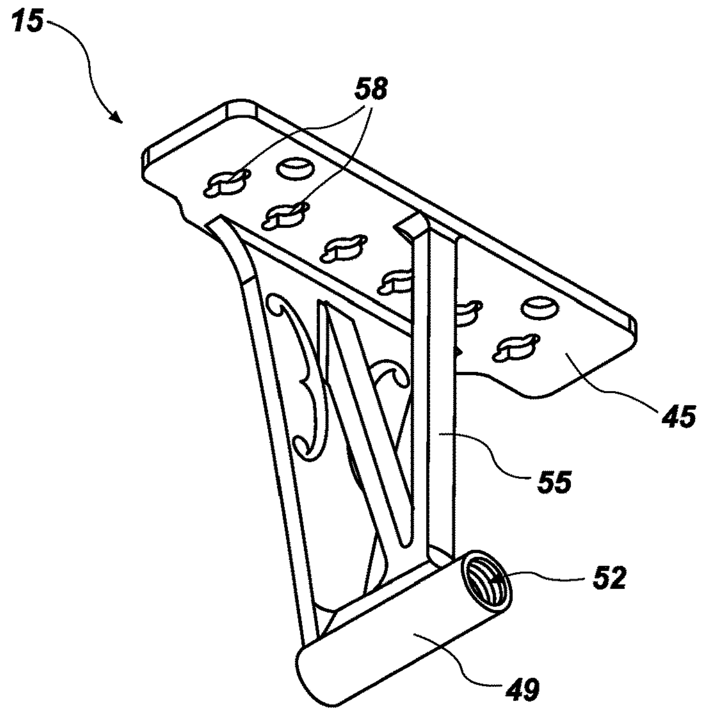
Figure 6:
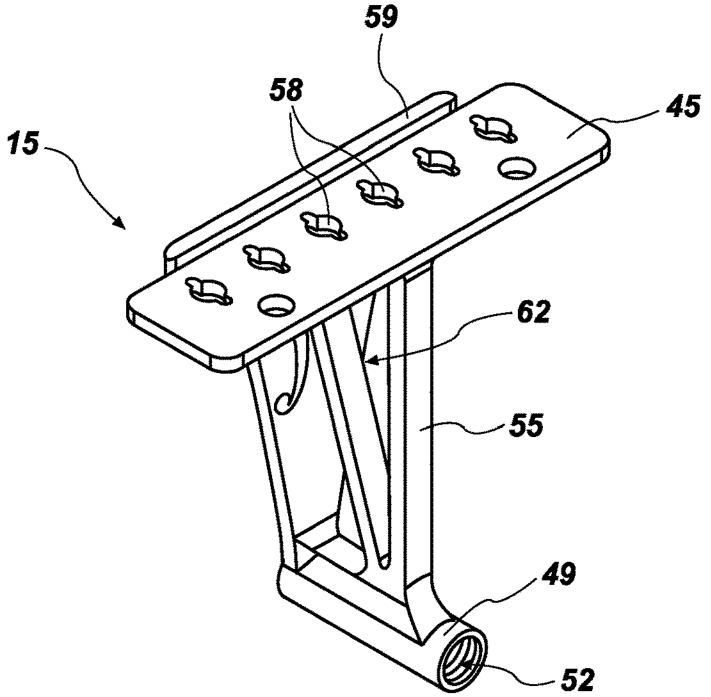
Figure 7:
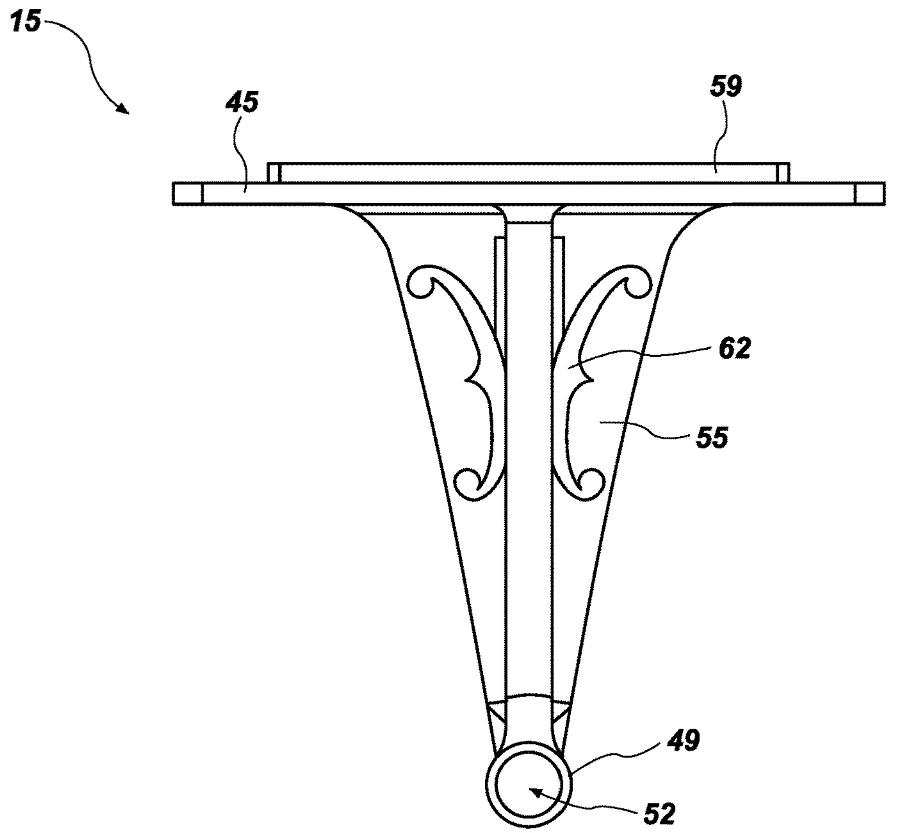
Figure 8:
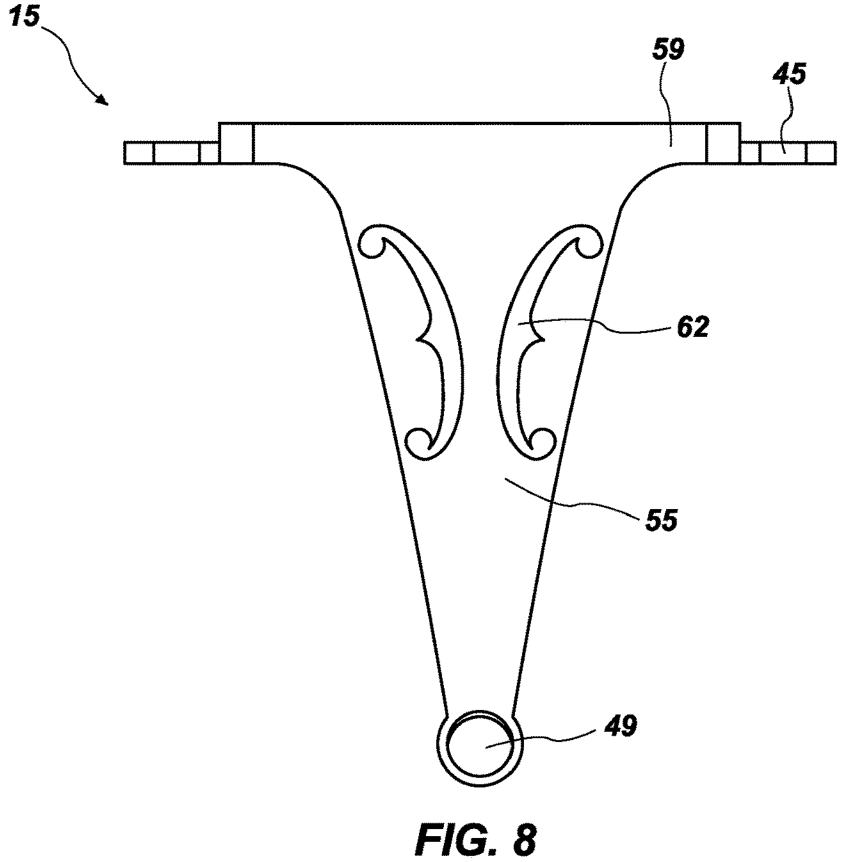

The sound plate 10 may also have an elongated, resonating portion 38. In some configurations, resonating portion 38 is cambered downwardly from the base portion 29, such that the resonating portion 38 extends farther into the body of the guitar. One or more cut-outs 42 may be positioned in the resonating portion 42 of the sound plate 10 to achieve the desired resonant qualities of the sound plate. FIGS. 2-4 show various configurations of sound plates 10, 10', and 10", respectively. It will be appreciated that sound plates having other shapes and sizes are also contemplated herein. It will also be appreciated that the sound plates may be mounted in different configurations, and may be mounted as desired by a user. For example, the sound plate may be mounted with the resonating portion closer to the sound hole of the guitar, or it may be mounted with the resonating portion farther from the sound hole of the guitar.

FIGS. 5 through 8 illustrate a bridge support 15 which may be attached to the underside of the base portion 29 of the sound plate 10. The bridge support 15 (and/or associated stress tube 20, as described in more detail below) may be used to support the top plate of the guitar or other instrument. Some instruments experience warpage of the top plate as a result of the deformative forces caused by the sustained tension in the instrument's strings. A bridge support 15 (and/or associated stress tube 20) may provide an adjustable force opposing the deformative force of the strings. The bridge support 15 and/or stress tube 20 may be either built into the instrument at the time of manufacture or added at a later time.

The bridge support 15 may have top mounting portion 45, and a bottom portion 49 opposite the top mounting portion 45, the bottom portion 49 defining a void 52. A vertical portion 55 may extend between the top mounting portion 45 and the bottom portion 49. The top mounting portion 45 may comprise one or more mounting holes 58 extending therethrough for receiving bridge pins, or bridge bolt pins 25 as described below. Mounting holes 58 of the bridge support 15 may generally align with the mounting holes 33 of the bridge sound plate 10. The top mounting portion 45 may also include a lateral projection 59, which may interface with the bridge sound plate 10, such that the mounting portion 29 of the bridge sound plate 10 rests on the top mounting portion 45 of the bridge support 15 and abuts the lateral projection 59.

The vertical portion 55 of the bridge support 15 may include one or more cut-outs 60 as desired. The cut-outs may function to provide structural stability of the bridge support 15 while reducing its weight. The cut-outs 60 may also serve to improve overall resonance of the guitar accessory system. The void 52 formed in the bottom portion 49 may be for receiving a stress tube as described below.

The bridge support 15 may be formed of any suitable material, and in some configurations it may be formed of a plastic, polycarbonate, metal, etc. According to one aspect, may be desirable for the bridge support 15 to be formed of a lightweight material. For example, aluminum, carbon fiber, etc. may be used. Additionally, the bridge support 15 may be formed in any suitable way, such as by three-dimensional printing, molding, etc.

Figure 9:
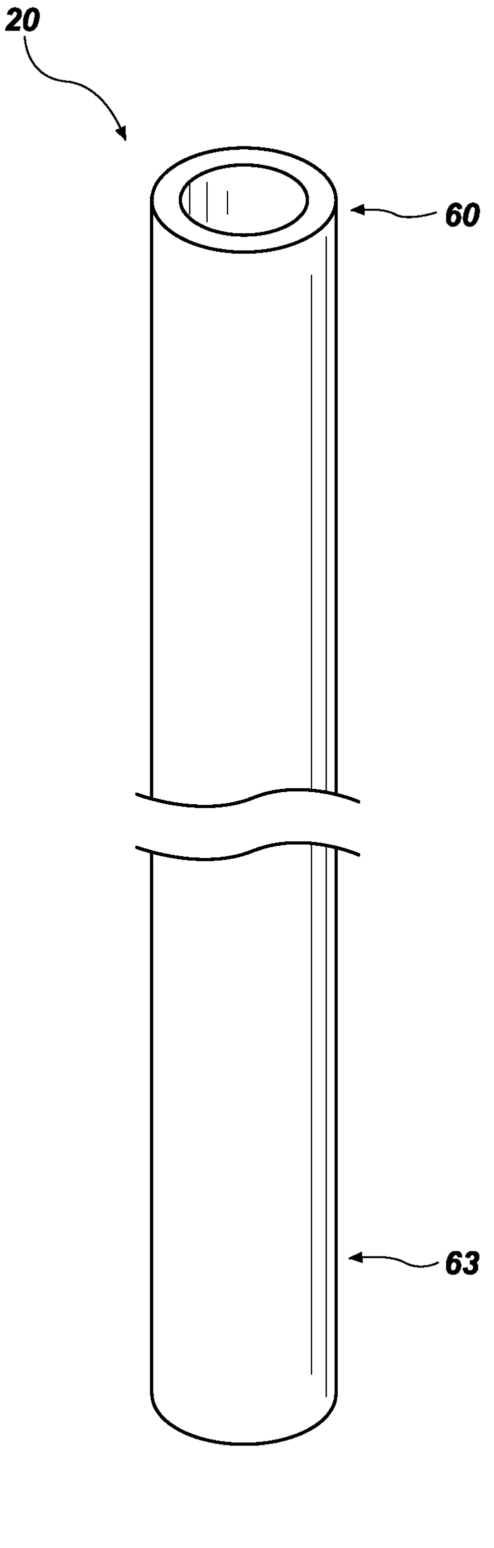
Figure 10:
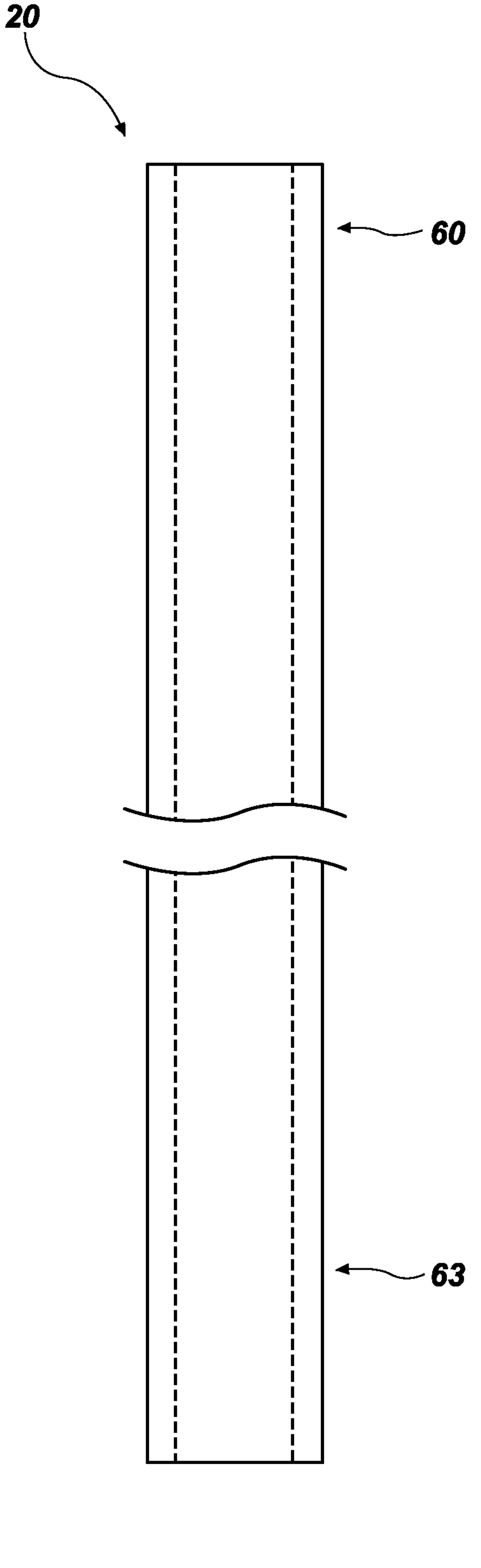

Turning now to FIGS. 9-10, one configuration of a stress tube 20 is shown. The stress tube may be inserted into the void 52 formed in the bottom portion 49 of the bridge support 15. Occasionally too much tension may be placed on the top plate of the guitar. One solution may be to place shims underneath the bridge, etc. Another solution may be to provide support within the guitar. Supports within the guitar may be provided as a preventative measure as well, with a new guitar built with the support inside to prevent any warpage in the top plates of guitars.

In the configuration shown, the stress tube 20 has a circular cross-section. Other cross-sectional shapes are also contemplated. The stress tube 20 may have a length of about 17 centimeters to about 27 centimeters. More particularly, the stress tube 20 may have a length of about 20 centimeters to about 24 centimeters. In one exemplary configuration the stress tube has a length of about 22 centimeters. The diameter of the stress tube may be selected as desired, and in some configurations the diameter may be about 4 mm to about 8 mm, with a thickness of about 1 mm to about 3 mm. In one exemplary configuration, the stress tube may have a diameter of 6 mm with a thickness of 2 mm.

The length of the stress tube 20 may correspond roughly the length from the bridge to the bottom of the body of the guitar. More specifically, the length of the stress tube 20 may correspond to the length from the bridge pin holes to the bottom of the body of the guitar. In some configurations, the stress tube 20 may be inserted into the void 52 of the bottom portion 49 of the bridge support 15 on a first end 60 of the stress tube, and a second opposing end 63 of the stress tube may abut the bottom of the body of the guitar. The placement of the stress tube 20 against the bottom of the body of the guitar may ensure that correct tension is placed on the bridge support 15 and the bridge sound plate 10.

An adjustment screw or any other suitable adjustment means may be used to adjust the placement of the stress tube for inducing compression in the stress tube 20 and bridge support 15. In some configurations the adjustment screw is turned through the void of the bridge support 15 and into/against the stress tube 20. The careful manipulation of the adjustment screw results in compression forces being induced within the stress tube 20 and the bridge support 15, which results in the imposition of an outward force upon the interior face of the top plate, which force corrects or prevents undesirable warping of the top plate.

The stress tube 20 may be made from any material desired. In some configurations it may be formed of a lightweight material. For example, aluminum, carbon fiber, etc. may be used. Additionally, the stress tube 20 may be formed in any suitable way, such as by three-dimensional printing, molding, etc.

Turning now to FIGS. 11-12, a bridge pin bolt 25 is shown. The bridge pin bolt 25 may comprise a head 70, a shank 73, a thread 77, and a nut 80 (see FIG. 13) for securing the bridge pin bolt 25. The head 70 may include a void 85 extending from a front 88 to a back 90 of the head 70. The void 85 may receive a guitar string. Bridge pin bolts 25 may be configured with varying sizes of voids to accommodate different strings. For example, lower strings have a larger diameter, and thus bridge pin bolts for the low E string and B string may have a larger diameter void 85 than the bridge pin bolts for the A string or the high E string. In some configurations, a set of 6 bridge pin bolts may be sold together, with two bridge pin bolts for the low E and A strings having a larger diameter void 85, two bridge pin bolts for the middle D and G strings having a slightly smaller diameter void 85, and two bridge pin bolts for the B and high E strings having the smallest diameter void 85. For example, the two largest bridge pins (for low E and A strings) may have a void with a diameter of about 2 to about 3 mm, and in one configuration may have a diameter of about 2.3 mm to about 2.4 mm. Bridge pins for the middle strings (D and G) may have a void 85 with a diameter of about 1.5 mm to about 2.5 mm, and in one configuration may have a diameter of about 2 mm. Bridge pins for the upper strings (B and high E) may have a void 85 with a diameter of about 1 mm to about 2 mm, and in one configuration may have a diameter of about 1.5 mm.

According to another aspect, the void 85 of the head 70 of the bridge pin bolt 25 may have an angle above horizontal from the front 88 to the back 90 of the head 70. This angle of the void 85 may be to approximate the angle the strings would have over a traditional guitar bridge and saddle. The angle may also be selected to change the break angle of the strings as desired. A change in the break angle of the strings may affect the tone and/or the playing feel of the guitar, as it may change the pressure needed to bend the string. Some guitarists may desire a steep string angle to make their tone more free by reducing the possibility of loose contact with the saddle. In other configurations, the void 85 may not have an angle, or may have an angle below horizontal.

In some configurations, the angle of the void 85 may be varied from the lower strings to the higher strings. For example, the void of the heads of the bridge pin bolts 25 for the lower strings (low E and A) may have an angle of about 18 to 20 degrees above horizontal, from the front 88 to the back 90 of the head 70. In one configuration, the angle for the void of the head for the bridge pin bolts for lower strings may be about 19 degrees above horizontal. The void of the heads of the bridge pin bolts 25 for the middle strings (D and G) may have an angle of about 20 to 22 degrees above horizontal, from the front 88 to the back 90 of the head 70. In one configuration, the angle for the void of the head for the bridge pin bolts for the middle strings may be about 20 degrees above horizontal. The void 85 of the heads of the bridge pin bolts 25 for the highest strings (B and high E) may have an angle of about 21 to 24 degrees above horizontal, from the front 88 to the back 90 of the head 70. In one configuration, the angle for the void 85 of the head for the bridge pin bolts for the highest strings may be about 22.5 degrees above horizontal. In other configurations, all the voids may have the same angle. In the exemplary configuration shown in FIG. 13, the angle of the void 85 is about 19 degrees above horizontal.

In some configurations, the head 70 may also including one or more cut-outs. For example, side cut-outs 94 may be provided towards the back 90 of the head 70. These side cut-outs may make it easier to change strings and/or ensure that strings do not become stuck within the head 70. A cut-away 97 towards the base of the head may also be provided, if desired, to reduce the weight of the bridge pin bolt 25 and/or to improve fitment over a guitar bridge and/or saddle. In other configurations, side cut-outs 94 and/or cut-away need not be provided.

The unthreaded shank 73 of the bridge pin bolt 25 may have a diameter such that it may be received within a bridge pin hole on a standard guitar bridge. For example, the diameter of the shank 73 may be about 3 mm to about 5 mm. In one configuration, the shank has a diameter of about 4.7 mm. As seen in the cross-sectional view of FIG. 13, the shank 73 may generally pass through the bridge pin holes of a standard bridge (bridge indicated at 5). Depending on the thickness of the bridge, the shank 73 may extend through the body of the guitar (indicated at 7), or terminate prior to the body of the guitar. The threaded portion 77 may extend for a few centimeters to accommodate for guitar bodies of various depths as well as guitar bridges of various depths. For example, the threaded portion 77 may be about 15 mm to about 30 mm long. In some configurations, the threaded portion 77 may be about 20 mm to about 25 mm long. In one configuration, the threaded portion 77 is about 22 centimeters long.

A nut 80 may be provided to secure the bridge pin bolt 25 to the body of the guitar. In configurations where the bridge sound plate 10 is used, the nut may secure the bridge pin bolt 25 to the body of the guitar and the bridge pin sound plate 10. In configurations where the bridge support 15 and/or stress tube 20 is also used, the nut may secure the bridge pin bolt 25 to the body of the guitar, the bridge sound plate 10, and the bridge support 15 (FIG. 13).

With reference to FIG. 14, placement of a string 101 (indicated in dashed lines) over a saddle 104 is shown. The string may pass over the saddle 105, and then extend downward as it extends towards the front 88 of the bridge pin bolt. In one configuration, the void 85 at the front 88 of the bridge pin bolt includes an overhang portion 107 or top overhang. This overhang portion 107 at the front of the void may force the string 101 to have a steeper downward angle between the saddle 104 and the bridge pin bolt, compared to bridge pin bolts without an overhang portion at the front of the void. Depending on the desired application, the length of the overhang portion 107 may be shorter or longer (a longer overhang portion may cause a more steep angle of the string downwards from the saddle to the bridge pin bolt compared to a shorter overhang and/or no overhang).

With reference to FIGS. 15A-15B, another configuration of a bridge pin bolt 25' is shown. In this configuration, the bridge pin bolt 25' includes a lateral cut-out 109 in a side of the head 70' of the bridge pin bolt 25'. This configuration allows a user to install the bridge pin bolt 25' and attach a string to the bridge pin bolt 25' by sliding the string through the lateral cut-out 109 and into the void 85'. This may eliminate the step of threading the string through the void from the front 88 to the back 90 of the void 85.

To install the accessories on an existing standard acoustic guitar, a user may first remove all the guitar's strings and bridge pins. Next, a user may choose to either connect the sound plate and other accessories via 6 bridge-pin-bolts on all 6 strings (similar to the configuration shown in FIGS. 16-17), or the user may select a design to connect the sound plate and accessories via 2 bridge-pin-bolts on just the lowest and highest strings (similar to the configuration shown in FIGS. 18-19). At this point, if the user is only using the bridge pin bolt accessory, they may attach the nut 80. But if the user is also using the sound plate 10, the user may align the sound plate 10 directly under the bridge, as shown in FIG. 20, with the base portion 29 of the sound plate 10 under the bridge, and the bridge pin bolts passing through the mounting holes 33 of the sound plate 10. If the user is not using the bridge support, nuts 80 may be screwed onto the threaded portion 77 of the bridge pin bolts at this point.

If a user is also using a bridge support 15, the user may similarly place the bridge support under the sound plate 10, aligning the top mounting portion 45 and one or more mounting holes 58 with the mounting holes 33 of the sound plate 10. The stress tube 20 may also be placed within the void of the void 52 formed in the bottom portion 49 of the bridge support 15.

While holding the sound plate 10 and bridge support 15 in place, a user may ensure a bridge pin bolt is inserted from the top of the bridge, through the sound plate, and through the bridge support. It will be appreciated that user may insert bridge pin bolts first, and then align the sound plate and bridge support from below, inserting both onto the bridge pin bolts. A nut and/or washer may then be screwed onto the bridge pin bolt, starting from the bottom of the bridge pin bolt, and tightened snugly but not overtightened, against the bridge support 15. It may be desirable to install the bridge pin bolts beginning from the center strings. In some configurations it may be desirable to install the bridge pin bolts in a specific order, such as the numerical order presented in FIG. 17.

FIG. 22 illustrates bridge pin bolts in place on a bridge, and in this configuration, a greater break angle of the strings is possible. The "break angle" is widely referred to by those with skill in the art as the angle that the string leaves both the nut and the saddle of the guitar. In the present configuration, it is the angle the string leaves the bridge pin bolt and the saddle of the guitar. An adequate angle at both points of contact is necessary to allow the string to resonate. Too shallow or too steep an angle may have a detrimental effect on the guitar's tone and playability. Different luthiers and players have different setup preferences (such as the break angle) to achieve optimal or desired resonance. FIG. 23 shows a cross sectional view of the accessories in place on an acoustical guitar.

It is believed that when incorporated into the design of a guitar (electric guitar, for example), the set of accessories disclosed in the above would enhance the resonant qualities and sustain of the instrument, which would create a fuller, richer sound and enhance the instrument's tone. The set of the accessories can be offered as an OEM feature on newly manufactured electric guitars. They could be offered in stock configurations, or consumers could potentially choose the size and shape of the plates they wanted incorporated into their instruments. The plates could also be incorporated into the designs of acoustic guitars, as well as into the designs of other string instruments such as bass guitars, banjos, mandolins, cellos, violas, violins, etc.

Once the set was incorporated into, or installed on, a guitar, an individual would simply play the guitar in the conventional manner. The addition of the brass sound plate below the bridge may enhance the resonant qualities of the guitar, to allow for a fuller, richer, and a more balance tones, as well as increased sustain from the instrument's strings. The accessories, alone or used together as part of the system, may increase the sustain and tonal brilliance of the instrument. This would improve the overall sound of the instrument, which would make it more enjoyable to play.

The sound plates, bridge pin bolt, bridge support, and/or stress tube as described herein could also be incorporated into the designs of other string instruments including bass guitars, banjos, mandolins, violins, violas, cellos, pianos, etc. This new product would be innovative in design, resonance enhancing, sonically pleasing, convenient, practical, and durable for years of effective use. For example, the bridge itself of a classical stringed instrument such as violin, viola, cello, bass, etc., may be made of brass or partially of wood and brass to improve the resonance. A brass sound plate may be installed by removing the back or front of the instrument, or the brass sound plate may be installed when the instrument is initially being built.

It is believed that the set of accessories for a guitar described in the above would fulfill the need for means that would enhance the resonant qualities of a guitar. The appealing features of the set would be its simple and effective design and ability to enhance a guitar's tonal qualities. Since brass is a material known for its resonant qualities, the sound plate may resonate when the guitar's strings were picked or strummed. This would enhance the resonant qualities of the guitar's body and thus provide a richer, more balanced tone, as well as increased sustain. In turn, this would give the instrument a fuller overall sound, which would not only enhance playability but could allow the musician to be more creative when playing when attempting to get different types of tones from the instrument or when creating different "patches" using various types of signal processing gear.

In addition, the accessories would provide the guitar makers with a new feature that would enhance the tonal qualities of their guitars. Guitar makers could offer the plates in stock designs or could create specially designed plates for guitarists who wished to customize their instruments according to taste. This would enhance the marketability of a manufacturer's instruments, which could increase sales and revenue. Furthermore, the plates of the set could also be offered as aftermarket accessories that could be installed on existing guitars. This would allow guitarists to improve the sounds of their existing instruments and would eliminate the need to purchase an entirely new guitar in order to enjoy the benefits of the product. Additionally, the bridge pin bolts may make it easier to string and/or change out strings on a guitar.

The sound plates as described herein were installed on a guitar and recordings taken at a recording studio. Recording Equipment used: LC60 Undertone Audio Custom Console; Vintage Telefunken 251; 2× Vintage Neumann U87; Studio A Live Room at Barefoot Recording Studio. The microphones used were chosen for their ability to capture all frequencies with great clarity and detail. The Telefunken 251 was placed directly in front of the guitar player at a distance of 2 feet. The pair of Neumann U87 microphones were used to capture a stereo image of the guitar player at a distance of 8 feet. The position of the microphones and player were not moved at any point during the recording. When recording the effects of the Droplet system, we used four acoustic guitars and one 9 foot grand piano. The guitars are an Avalon A100CE, Taylor 414CE, Taylor 314CE and a Martin D41. The piano is a Yamaha C9.

Guitars: The effects of the sound plates were obvious to the ears of listeners across all guitars in two aspects. The most noticeable of the three was in the way that it reduced the amplitude of frequencies between 150 Hz to 350 Hz. This inevitably leads to clarity of tone. The second aspect was in the sustain of the individual notes. Although not as easily heard, it is very obvious in the spectral analyzer shown in the comparison video. An interesting side affect of the increased sustain can be seen on bottom guitar strings G, B and E. During the decay, frequencies below 100 Hz increase in amplitude.

From a guitar player's perspective, the differences caused by the sound plates may mean an improvement in overall tone of the guitar. If the guitar naturally tends to sound "muddy" either in person or on recordings, the reduction in frequencies between 150 Hz and 350 Hz that are caused by the sound plates would offer improved clarity to the player. To a listener, the same things will be heard that are heard by the guitar player but from a further distance. From an audio engineer's perspective, the reduction in frequencies between 150 Hz and 350 Hz can mean that the instrument will sit much better in an overall mix. These are the first frequencies that sound engineers reduce when trying to get an acoustic guitar to sit in a mix well. This also makes it easier to record music that involves only a guitar and a singer. This is the case with many live performances in countless venues. With improved harmonics and a reduction in 150 to 350 Hz, a singer's voice would likely stand out more because the amount of competing frequencies would be lessened. The same would go if other guitars or instruments were added to the performance.

Piano: The effects of the Droplet system were noticeable on the Yamaha C9 We used two U87 microphones spaced 2 feet apart and placed at the opening of the piano just to the left of the piano's stick that holds the lid up. This captured a balanced stereo image of the low and high frequencies. In addition, the room's reverberation was also captured by the microphones. This ended up with a perfect balance between direct sound and reverb sound.

The main difference in tone was the sustain in the higher notes from middle C and up. The spectral analysis in the comparison video will support the audible differences that are heard. Although the C9 sounds great as is, what the sound plates add is an enhancement of overtones and sustainment in the upper registers of the instrument.

For a piano player, the subtle differences could potentially alter the way a piece is performed. In some cases, the player performed their own composition because they noticed the improvements. For the listener, increased overtones may resonate well with the surroundings in their listening environment. The sound plates would be an advantage if used on an album recorded specifically for HiFi audio fans.

From an audio engineer's perspective, the sound plates would be great for a solo classical or Jazz piano piece because of the added sustain to the higher notes. The added sustain could also help give an added sense of reverberation. It would definitely have an effect on which microphones would be used to record the instrument. More overtones and clarity may prompt an engineer to choose a microphone that is better suited to capture the extra detail.

As was for the guitars, one common change that occurred as a result of the increased sustain was how certain overtones would increase in volume over time that previously did not have a chance to develop.

Overall, the studio recordings showed that the resonating accessories added clarity, sustain and an enhancement of overtones in every guitar and piano that it was tested on. This may be helpful for musicians that are looking to make their instrument more exciting or are looking to improve the overall tone of their guitar or piano. It may also translate well through consumer level listening devices and speakers. Musicians, producers, audiophiles and casual listeners would enjoy the added benefits.

According to another aspect of the present disclosure, one or more sound plates are provided, and a method of using such sound plates on a plurality of instruments is described. While guitars, drums and pianos are described herein with respect to the method of use, these instruments are used by way of example and not of limitation.

FIGS. 24-26 show the application of one or more sound plates(s) 10 to a drum. In the exemplary configuration, four sound plates 10 are used in the drum, and are placed vertically with respect to the body of the drum. The sound plates are also approximately spaced evenly (approximately every 90 degrees). Depending on the desired sound, fewer or additional sound plates may be installed. The sound plates 10 may also be installed laterally, but the vertical installation may result in the better effects from the sound plates(s).

Sound plates may also be applied to pianos. In some configurations, the sound plates may be used directly on the soundboard of either a grand piano or an upright piano. Various configurations of resonators may be used, and they may be placed at various locations and at various angles on the soundboard to achieve the sound desired. The sound plates may be screwed, glued, taped, or otherwise connected to the soundboard. FIG. 27 illustrates an exemplary sound plate that may be used in some configurations. The size of the sound plate, shape of its one or more cut-outs, angle of the sound plate, etc., may all be optimized for particular settings and/or instruments.

Turning now to FIGS. 28-30, there is shown another type of sound plate 110. This sound plate 110 may be adjustable or tunable. The sound plate 110 may be provided with one or more slots 115, and one or more tuning elements 120 within the slots 115. For example, the tuning elements 120 may be comprised of a tunable bolt (FIG. 31) connected to a tunable nut (FIG. 32). When the user desired to tune the sound plate 110, the user may loosen the nut, adjust the nut and bolt to the desired location within slot 115, and then tighten the nut. Other methods of adjusting the tuning elements 120 may also be used, such as moveable elements that are frictionally fit within the slots, etc.

The tuning element 120 within the slot 115 may be moved to any location as desired for the optimum sound. In configurations where the sound plate 110 has two or more slots 115, the moveable elements may be moved in parallel or conjunction, or they may be adjusted independently as desired.

FIG. 33 shows an additional configuration of an adjustable or tunable sound plate. The sound plate 110' may include at least one projection 125. In the configurations shown, two projections 125 are provided. The projections 125 may be provided with one or more tuning elements 120 that are movable along the length of the projections 125. In this manner, the resonance of the sound plate 110 may be adjusted by moving the tuning elements 120 along the length of the projections 125.

According to another aspect, an adjustable or tunable sound plate 210 may be provided which may attached to the back side of the headstock of a guitar. FIG. 34 shows how a sound plate 210 may be attached to the back side of the headstock. FIGS. 35-36 show various configurations of tunable sound plates 210 that may be attached to the back side of a guitar headstock. It will be appreciated that adaptations of the tunable sound plate 210 can be made so the tunable sound plate 210 can be used in conjunction with other instruments, such as mounted to the scroll of a violin, viola, cello, bass, etc.

One or more tunable sound plates (such as sound plate 210, 110, etc.) may allow a user to adjust or tune the sound plate to optimize overtones and harmonics. Overtones are musical tones which are a part of the harmonic series above a fundamental note, and may be heard with it. Similarly, a harmonic is an overtone accompanying a fundamental tone at a fixed interval, produced by vibration of a string, column of air, etc. in an exact fraction of its length. Depending on the setting the instrument is being used in, it may be advantageous to be able to maximize overtones and/or extend harmonics of a single note to produce a sound that is more rich and full to the human ear. Use of sound plates as disclosed herein may maximize overtones and extend harmonics, and use of tunable sound plates may give a musician even greater control over the extension of the harmonics produced from playing a single note or one or more notes.

A guitar accessory system may include: a bridge sound plate to be attached inside a body of the guitar under the bridge; a bridge support to be attached to an underside of the bridge sound plate, the bridge support having a top side and a bottom void for receiving a stress tube, and a vertical portion extending from the top side to the bottom void; the stress tube, the stress tube insertable into the bottom void of the bridge support, the stress tube and bridge support to provide tension to the bridge sound plate within the body of the guitar; at least one bridge pin bolt for connecting the bridge sound plate and bridge support to the body of the guitar, the at least one bridge pin bolt comprising a head, a shank, a threaded portion, and a nut, the head of the bridge pin bolt having a void therethrough extending from a front of the head to a back of the head, the void having an angle of between 15 to 25 degrees.

In some configurations, the bridge sound plate is formed of brass and comprises six holes therethrough, each of the six holes to receive the threaded portion of the at least one bridge pin bolt. Similarly, the bridge support may include six holes through the top side, each of the six holes to receive the threaded portion of the at least one bridge pin bolt.

A guitar bridge pin bolt may include: a head, a shank, a thread, and a nut, the head of the bridge pin bolt having a void therethrough extending from a front of the head to a back of the head to receive a guitar string therethrough, the void extending upwardly from the front of the head to the back of the head.

In some configurations, the void extends upwardly from the front of the head to the back of the head at an angle of between about 15 degrees to about 25 degrees above horizontal. In one configuration, the void extends upwardly from the front of the head to the back of the head at an angle of between about 5 degrees to about 45 degrees. In another configuration, the void extends upwardly from the front of the head to the back of the head at an angle of between about 18 degrees to about 22 degrees. In one exemplary configuration, the angle may be about 19 degrees.

According to another aspect, the front of the head comprises a top overhang that extends outwardly past the shank, the top overhang to force a guitar string threaded through the void downwardly. In one configuration, the top overhang is about 1 millimeter to about 5 millimeters.

In some configurations, the head further comprises at least one cut-out at the back of the head to improve installation of a string within the void. Additionally, the head may further comprise at least one cut-out on an underside of the head to reduce a weight of the bridge pin bolt, and/or to improve fitment of the bridge pin bolt over a bridge of the guitar. The guitar bridge pin bolt may be formed of brass.

According to another aspect, a method of improving the sustain of a drum, the method comprising: selecting a drum, selecting a sound plate, and installing the sound plate substantially vertically within a body of a drum. The method may also be used to improve the sustain of a piano by installing the sound plate on a sound board of a piano.

Various configurations of sound plates may be used, the sound plate comprising: a main body having a first slot and a second slot formed therein; and a first tuning element moveable within the first slot and a second tuning element moveable within the second slot to adjust a resonance of the sound plate. In other configurations, the sound plate comprises: a main body having a first slot formed therein; and a first tunable element moveable within the first slot to adjust a resonance of the sound plate.

In other configurations, the sound plate comprises a main body having a first projection extending therefrom; and a first tunable element moveable along the first projection to adjust a resonance of the sound plate. The body of the sound plate may also include a second projection extending therefrom and a second tuning element moveable along the second projection to adjust a resonance of the sound plate.

Those skilled in the art can now appreciate from the foregoing description that the broad teachings of the present disclosure can be implemented in a variety of forms. Therefore, while the guitar accessory set of the present disclosure has been described in connection with particular examples thereof, the true scope of the disclosure should not be so limited since other modifications will become apparent to the skilled practitioner upon a study of the drawings, specification and claims that follow.

What is claimed:

1. A method of improving a sustain of a drum, the method comprising:

selecting a drum;

selecting a sound plate, the sound plate comprising a main body having a first slot formed therein, and a first tunable element moveable within the first slot to adjust a resonance of the sound plate; and installing the sound plate substantially vertically within a body of a drum.

2. The method of claim 1, wherein the sound plate further comprises:

a second slot formed in the main body; and a second tuning element moveable within the second slot to adjust the resonance of the sound plate.

3. The method of claim 1, wherein the sound plate comprises the main body having a first projection extending therefrom; and the first tunable element moveable along the first projection to adjust the resonance of the sound plate.

4. The method of claim 3, wherein the main body of the sound plate comprises a second projection extending therefrom and a second tuning element moveable along the second projection to adjust the resonance of the sound plate.

5. The method of claim 1, further comprising installing a second sound plate substantially vertically within the body of the drum.

6. The method of claim 1, further comprising adjusting the resonance of the sound plate.

7. The method of claim 6, wherein adjusting the resonance of the sound plate comprises:

positioning the first tuning element within the first slot of the sound plate at a first location; and moving the first tuning element to a second location within the first slot of the sound plate.

8. The method of claim 1, wherein the sound plate comprises brass.

9. A method of improving a sustain of a drum, the method comprising:

selecting a drum;

selecting a sound plate, the sound plate comprising:

a base portion having a plurality of mounting holes, a main body cambered downwardly from the base portion, and at least one tuning element in connection with the main body; and installing the base portion of the sound plate within a body of the drum, the sound plate installed substantially vertically within the body of the drum.

10. The method of claim 9, wherein the main body comprises at least one slot and the at least one tuning element is moveable within the at least one slot to adjust a resonance of the sound plate.

11. The method of claim 9, wherein the main body comprises at least one projection and the at least one tuning element is moveable along the at least one projection to adjust a resonance of the sound plate.

12. The method of claim 9, further comprising adjusting a resonance of the sound plate.

13. The method of claim 11, wherein adjusting the resonance of the sound plate comprises adjusting a position of the at least one tuning element within the main body.

14. The method of claim 9, wherein the at least one tuning element comprises a tunable bolt attached to a tunable nut.

15. The method of claim 9, wherein the sound plate comprises brass.

16. A method of improving a sustain of a drum, the method comprising:

selecting a drum;

selecting a sound plate, the sound plate comprising:

a base portion having a plurality of mounting holes, a main body cambered downwardly from the base portion, the main body having either (i) at least one slot formed therein or (ii) at least one projection, and at least one tuning element in connection with the main body;

installing the base portion of the sound plate within a body of the drum, the sound plate installed substantially vertically within the body of the drum; and adjusting a resonance of the sound plate by adjusting a position of the at least one tuning element either (i) within the at least one slot or (ii) along the at least one projection, such that the resonance of the sound plate optimizes overtones and/or harmonics of the drum.

17. The method of claim 16, wherein the at least one tuning element comprises a bolt attached to a nut.

18. The method of claim 16, wherein the main body of the sound plate comprises the at least one slot formed therein and the at least one tuning element is moveable within the at least one slot.

19. The method of claim 16, wherein the main body of the sound plate comprises the at least one projection and the at least one tuning element is moveable along the at least one projection.

20. The method of claim 16, wherein adjusting the resonance of the sound plate comprises adjusting the position of the at least one tuning element within the at least one slot of the main body.

21. The method of claim 16, wherein adjusting the resonance of the sound plate comprises adjusting the position of the at least one tuning element along the at least one projection of the main body.

* * * * *